United States Patent [19]
Konishi et al.

[11] Patent Number: 5,636,080
[45] Date of Patent: Jun. 3, 1997

[54] MAGNETIC RECORDING/PLAYBACK APPARATUS HAVING A LEAF-TYPE RESILIENT MEMBER WHICH IS PROVIDED BETWEEN A GUIDE POST AND A TYPE LOADING MEMBER AND IS URGED AGAINST THE GUIDE POST

[75] Inventors: Akio Konishi, Hirakata; Hideaki Yoshio, Moriguchi; Tetsuki Asaoka, Takatsuki; Yoshitada Moriyasu, Katano; Hiroshi Kurumatani, Osaka; Sigeo Ueda, Yao; Takeshi Syuuke, Neyagawa; Eiji Nagasaki, Kishiwada, all of Japan

[73] Assignee: Matsushita Electric Industrial Co., Ltd., Osaka, Japan

[21] Appl. No.: 561,859

[22] Filed: Nov. 22, 1995

Related U.S. Application Data

[63] Continuation of Ser. No. 354,060, Dec. 6, 1994, Pat. No. 5,490,091, which is a continuation of Ser. No. 867,469, Apr. 13, 1992, abandoned.

[30] Foreign Application Priority Data

| | | | |
|---|---|---|---|
| Apr. 17, 1991 | [JP] | Japan | 3-085059 |
| Apr. 17, 1991 | [JP] | Japan | 3-085060 |
| Apr. 17, 1991 | [JP] | Japan | 3-085065 |
| Apr. 17, 1991 | [JP] | Japan | 3-085067 |
| Apr. 17, 1991 | [JP] | Japan | 3-085076 |

[51] Int. Cl.⁶ .................................................. G11B 15/60
[52] U.S. Cl. ................................. 360/95; 360/130.23
[58] Field of Search ....................... 360/84, 85, 93, 360/95, 96.5, 130.2–130.24

[56] References Cited

U.S. PATENT DOCUMENTS

| | | | |
|---|---|---|---|
| 4,556,922 | 12/1985 | Erhart | 360/85 |
| 4,561,029 | 12/1985 | Maeda | 360/85 |
| 4,752,845 | 6/1988 | Suzuki | 360/95 |
| 4,984,105 | 1/1991 | Hwang | 360/95 |
| 5,041,928 | 8/1991 | Sasaki et al. | 360/95 |
| 5,050,008 | 9/1991 | Kondo | 360/95 |
| 5,099,371 | 3/1992 | Choi | 360/96.1 |
| 5,103,356 | 4/1992 | Fujiwara et al. | 360/95 |
| 5,128,814 | 7/1992 | Morimoto | 360/95 |
| 5,134,536 | 7/1992 | Komatsu et al. | 360/130.21 |
| 5,151,832 | 9/1992 | Nagasawa | 360/95 |
| 5,159,506 | 10/1992 | Eino et al. | 360/95 |
| 5,167,380 | 12/1992 | Choi | 360/96.3 |
| 5,196,971 | 3/1993 | Tsuchiya et al. | 360/130.23 |
| 5,233,489 | 8/1993 | Kim | 360/95 |

FOREIGN PATENT DOCUMENTS

| | | |
|---|---|---|
| 0087952A3 | 9/1983 | European Pat. Off. |
| 4132542A1 | 4/1992 | Germany |
| 4-318356 | 11/1992 | Japan |
| 2205677 | 12/1988 | United Kingdom |

*Primary Examiner*—Jefferson Evans
*Attorney, Agent, or Firm*—Watson Cole Stevens Davis P.L.L.C.

[57] ABSTRACT

The invention is concerned with a magnetic recording/playback apparatus in which a magnetic tape is pulled out from a tape cassette and wound around a cylindrical rotary head cylinder, having a rotary head built therein, over a predetermined angle to record/playback signals through the rotary head, and more particularly, with a tape guide post driving mechanism, a pinch roller pressing mechanism and a tension serve mechanism. Specifically, the invention provides a tape guide post driving device which can reduce the size, weight and thickness of the apparatus by ensuring a large angle of thickness of the apparatus by ensuring a large angle of rotation of a rotating member, which includes a tension arm, in a direct manner. Also, the invention realizes a pinch roller pressing mechanism in which a sufficient stroke can be obtained even when a cam gear is reduced in its diameter and can provide a sufficient stroke even with a small amount of rotation. Further, the invention prolongs the service life and achieves a remarkable reduction in both the number of parts used and the number of assembling steps by using a pad brake (brake member), instead of a band brake, for braking a rotating member and bringing the brake member into full contact over the former's entire surface with the member being braked.

1 Claim, 32 Drawing Sheets

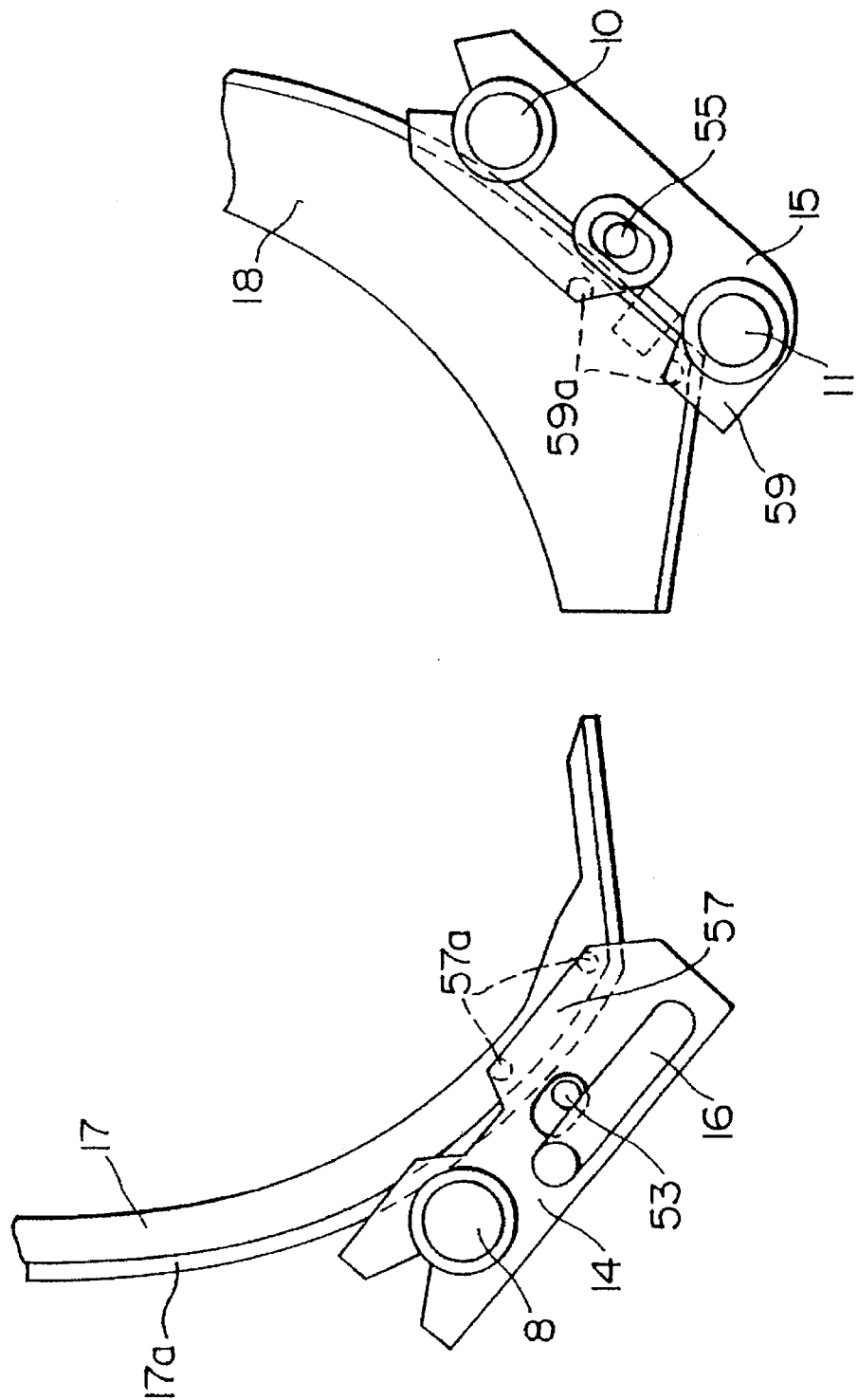

MAGNETIC RECORDING/PLAYBACK APPARATUS HAVING A LEAF-TYPE RESILIENT MEMBER WHICH IS PROVIDED BETWEEN A GUIDE POST AND A TYPE LOADING MEMBER AND IS URGED AGAINST THE GUIDE POST

This is a continuation of application Ser. No. 08/354,060 filed Dec. 6, 1994, now U.S. Pat. No. 5,490,019 which is a continuation of application Ser. No. 07/867,469, filed Apr. 13, 1992 (abandoned).

BACKGROUND OF THE INVENTION (a) Industrial Field of the Invention

The present invention relates to a magnetic recording/playback apparatus in which a magnetic tape is automatically withdrawn out of a tape cassette having a supply reel and a take-up reel provided therein to record/playback signals by a head, and more particularly, to a tape guide post driving mechanism, a tension servo mechanism and a pinch roller pressing mechanism.

(b) Description of the Prior Art

In a conventional magnetic recording/playback apparatus such as a VTR, a cam groove for a cam gear adapted to turn a tension are is generally formed by utilizing a swing cam. Because this arrangement entails a difficulty in enlarging an angle of turn of the tension arm, it has been required to increase the turn angle through another arm.

A tension post driving mechanism in the prior art will be described below with reference to the drawings.

In FIGS. 31 and 32, a driving force of a loading motor 30 is transmitted to a cam gear 34 through a dual gear comprising gears 31a, 31b, a dual gear comprising gears 32a, 32b, and a dual gear comprising gears 33a, 33b. The cam gear 34 comprises a swing cam in such a manner that as a cam engagement portion 91a of a cam lever 91 moves along a cam groove 34a defined in the cam gear 34 from a position near the center of the cam gear 34 toward the outer periphery, a speed-up gear portion 91b of the cam lever 91 is rotated to turn a tension arm 90 to a large extent so that a tension post 9 is turned to a tape running position show in FIG. 32. When the tension post 9 turns to the tape running position, the cam engagement portion 91a of the cam lever 91 becomes free from the cam groove 34a and, thereafter, the cam lever 91 is balanced by the braking force of a tension band 94 wound around the circumference of a reel stand 99, spring force of a tension spring 92, and tensile force of a magnetic tape wound around the tension post 9, thereby controlling a tape tension.

However, the above conventional arrangement has suffered from such a first problem to be solved by the present invention that the cam lever 91 is needed as a separate member in order to obtain a large angle of turn of the tension arm 90 and, since the cam groove 34a of the cam gear 34 is formed to extend from a position near the center of the cam gear 34 to a position near the outer periphery, it is difficult to form another cam groove for a different purpose, which is problematic in reducing the size, weight and thickness of a magnetic recording/playback apparatus.

Furthermore, various kinds of trials have been recently made for reducing the size, weight and thickness of VTR. A mechanism of pressing a pinch roller in VTRs has also been intensively researched in the past because that mechanism significantly affects the total size of VTR.

A pinch roller pressing mechanism in the prior art will be described below with reference to the drawings. FIGS. 33 to 35 are top plan views showing the pinch roller pressing mechanism in the prior art. Note that to clarify the difference from a mechanism of the present invention (shown in FIGS. 12 to 14), the prior art mechanism is shown as having the same arrangement as the present one except the structure of a cam gear 93.

In the drawings, denoted by the reference numeral 93 is a cam gear having a cam portion 94 formed therein. 60 is a pinch rod which moves in an interlocking relationship with the cam portion 94 of the cam gear 93, and has at one end an elongated hole 95 extending in a direction of length of the pinch rod 60 and a cam follower 96 engaging with the cam portion 94, the elongated hole 95 being fitted over a shaft 97 of the cam gear 93. The other end of the pinch rod 60 is connected through a pin 66 with one end of a first pinch charge arm 65 pivotally supported by a shaft 64 mounted upwardly on a chassis 1. The first pinch charge arm 65 has the other end to which a second pinch charge arm 68 is pivotally supported at its middle portion through a pin 67. A spring 69 is interposed between the one end of the first pinch charge arm 65 and one end of the second pinch charge arm 68. A pin 70 provided at the other end of the second pinch charge arm 68 is fitted into an elongated hole 73 at one end of a pinch arm 72 turnably attached to the chassis 1 through a pin 71, and a pinch roller 12 is attached to the other end of the pinch arm 72 at the same inclination as a capstan 20.

The following is the description concerning an operation in which the pinch roller 12 is press-contacted with the capstan 20 as the cam gear 93 rotates after completing an operation of loading the magnetic tape. As shown in FIG. 33, the cam follower 96 provided on the pinch rod 60 enters a radial region of the cam portion 94 so as to pull the pinch rod 60 in a direction of an arrow d. As a result, the first pinch charge arm 65 is turned in a clockwise direction about the shaft 64 to push the second pinch charge arm 68 in a direction of an arrow g. Then, the pinch arm 72 is turned through the pin 70 in counterclockwise direction about the pin 71 by virtue of the resilient force of the spring 69 is order to press-contact the pinch roller 12 with the capstan 20.

However, the above conventional arrangement has suffered from such a second problem to be solved by the present invention that because the circumferential region of the cam portion 94 is utilized during the loading operation and the radial region of the cam portion 94 is utilized during the operation of pressing the pinch roller 12, it has been necessarily needed to increase the diameter of the cam gear 93 when the distance by which the pinch rod 60 must be moved in the direction of the arrow d to press-contact the pinch roller 12 with the capstan 20 becomes long.

Additionally, the cam gear 93 is required to be rotated through about an angle of about 180° for press-contacting the pinch roller 12 with the capstan 20. Therefore, in an attempt to utilize the cam gear 93 also for some other operation than the operation of pressing the pinch roller, an allowable range of utilization has been limited.

Meanwhile, as one type of braking unit for magnetic recording/playback apparatus, there has been recently used a band brake in a tension serve device.

A first type of tension servo device in the prior art will be described below.

FIGS. 36 and 37 show the first type tension serve device in the prior art. FIG. 36 is a top plan view of the first prior art device and FIG. 37 is a side view of the first prior art device.

In FIG. 37, denoted by 101 is an idler gear provided at such a position as allowing the idler gear 101 to be meshed with a gear portion 103 of an S-reel stand 102. 104 is a felt through which the S-reel stand 102 is press-contacted with the gear portion 103 so as to produce a latch force. 105 is a cylindrical portion formed integrally with the S-reel stand 102. A band 106 is wound around the circumference of the cylindrical portion 105. 107 is a chassis on which a shaft 108 is mounted upwardly with the S-reel stand 102 rotatably fitting over the shaft 108. 109 is a hub attached to the S-reel stand 102 with a tape 110 wound around the hub 109. 111 is a tension arm turnably fitted over a shaft 112. The tension arm 111 has one end at which a tape post 113 is provided, and the other and to which a tension spring 114 and the band 106 are attached. 115, 116 are posts fixed to the chassis 107.

The operation of the tension serve device thus arranged will be explained below. First, when the apparatus is operated in a rewind or review mode, the idler gear 101 is meshed with the gear portion 103 to rotate the S-reel stand 102 counter-clockwise with a certain degree of clutch force. Then, upon entering a playback mode, the idler gear 101 is shifted to mesh with a T-reel stand. The tape 110 now runs in a direction of arrow A and the S-reel stand 102 also rotates clockwise along therewith. The tension arm 111 is urged to turn clockwise by the tensile force of the tension spring 114. Due to this urging force, the band 106 is fastened around the cylindrical portion 105 to apply a braking torque to the S-reel portion 102. Because the tape 110 running in the direction A is wound around the tape post 113, an increase of tape tension creates a moment tending to rotate the tension arm 111 counter-clockwise. This weakens the urging force of the tension spring 114 so that the braking torque on the S-reel stand 102 is lowered to reduce the tape tension. In this way, the tape tension is controlled.

Next, as a second type braking unit for magnetic recording/playback apparatus in the prior art, a soft braking device will be described below.

FIG. 38 is a top plan view of the second type prior art device. Denoted by 140 is a reel stand rotatably fitted over a shaft 141. The reel stand 140 is provided with a cylindrical portion 142. 143 is a brake lever turnably fitted over a shaft 144. The brake lever 143 has at one end a bent portion 143a to which a brake member 145 is fixedly bonded, and at the other end a spring 146 of which the opposite end is fixed to the chassis. The operation of the soft braking device thus arranged will now be explained.

The spring 146 urges the brake lever 143 to turn the same clockwise, whereupon the brake member 145 comes into press-contact with the cylindrical portion 142 for applying a certain degree of braking torque to the reel stand 140.

However, the above first prior art device has suffered from such a third problem to be solved by the present invention that the number of parts used is large and the assembling efficiency is poor. More specifically, though not shown, the first prior art device requires a number of parts. While the band 106 is illustrated as a one piece member, it is actually constituted by sticking a felt to a belt made of phosphor bronze together. Not only is a member for fixing the band 106 to the chassis 107 needed, but also another member for fixing it to the tension arm 111 in a pivotal manner are needed. Additionally, for positioning the tension post, it is typical to insert a band length adjusting mechanism at a point where the band 106 is fixed to the tension arm 111. Thus, the first prior art device requires five or more parts, including the band body. Moreover, when mounting the S-reel stand 102, it must be inserted from above while spreading the band 106 to a sufficient extent, which deteriorates the assembling efficiency.

The above second prior art device has suffered from a disadvantage that when felt or the like is used as the brake member 145, a high degree of braking torque cannot be obtained. Another disadvantage is that when resin or the like is used for the brake member 145 to produce a high degree of braking torque, the brake member 145 as a rigid body is press-contacted with the cylindrical portion 142 through linear contact as shown in FIG. 38 to increase a PV value, hence resulting in reduction in the service life of the brake member 145.

SUMMARY OF THE INVENTION

To solve the above-mentioned first problem, the present invention has its object to provide a tape guide post driving device which can ensure a large angle of rotation of a rotating member, including a tension arm, in a direct manner, and can reduce the size, weight and thickness of the VTR.

Also, to solve the above-mentioned second problem, the present invention has its object to realize a pinch roller pressing mechanism which can obtain a sufficient stroke even with a cam gear reduced in its diameter, and can provide a sufficient stroke even with a small amount of rotation.

Further, to solve the above-mentioned third problem, the present invention has its object to prolong the service life and achieve a remarkable reduction in both the number of parts used and the number of assembling steps by using a pad brake (brake member), instead of a band brake, for braking a rotating member and bringing the brake member into full contact with the member to be braked over the former's entire surface.

To solve the above first problem, a tape guide post driving device of the present invention comprises a gear having a cam, a rotating member having a cam-shaped portion, of which an angle of rotation is limited by rotation of the cam of the gear, and a tape guide post provided on the rotating member, wherein a contact point between the cam-shaped portion of the rotating member and the cam of the gear is positioned near a middle point between the center of rotation of the rotating member and the center of the gear, and the casp-shaped portion of the rotating member is positioned near the center of rotation of the rotating member. Thus the above first problem is solved by applying such an arrangement to a tension arm.

With the above arrangement, a large angle of rotation of the rotating member including the tension arm can be provided in a direct manner, and the need of increasing the angle of rotation of the rotating member through a separate member is eliminated. Further, since the cam can be formed by only a region near the outer periphery of the cam gear, a region in the vicinity of the center can be used for another cam. Thus, the above arrangement remarkably contributes to reduction of the size, weight and thickness of the magnetic recording/playback apparatus.

Also, to solve the above second problem, a pinch roller driving device of the present invention comprises a cam gear having a cam portion formed in the top or bottom surface thereof and transmitting driving force from a drive source to a pinch arm, which is supporting a pinch roller, when the pinch roller is press-contacted with a capstan, and a pinch arm driving member connected cooperatingly with the pinch arm, having a guide portion to guide a direction of movement of the member, and also having a cam follower portion engaging with the cam portion, wherein the cam portion comprises a first cam groove extending toward a rotation axis of the cam gear and a second cam groove extending in a circumferential direction of the cam gear, and as the cam gear rotates, the cam follower portion is moved through an amount larger than a maximum distance from the cam portion to the rotation axis of the cam gear.

With such an arrangement, the angle of rotation of the cam gear required for the press-contacting operation of the pinch roller can be greatly reduced, and the radial length of the cam portion of the cam gear can be greatly shortened.

Further, to solve the above third problem, in a braking device of the present invention, a brake member consists of two types of materials and a thin film as one material positioned at the side of a member to be braked comes into full contact with an S-reel stand over the former's entire surface, thereby producing a braking torque. Therefore, the PV value is reduced and the service life is prolonged. Unlike the case of using a band, the number of parts used is also reduced.

In addition, since the brake member fixed to a lever is press-contacted with the S-reel stand to impose braking force on the S-reel stand, the brake member can be formed as one part, which enables reduction in the number of parts used. It is further possible to eliminate the need of adjusting the position of a tension arm and improve the assembling efficiency.

BRIEF DESCRIPTION OF THE DRAWINGS

FIG. 8 is a top plan view showing a state where boats are guided along loading guides immediately after starting the tape loading operation in the loading post driving device.

DETAILED DESCRIPTION OF THE PREFERRED EMBODIMENT

A first embodiment of the present invention will be described hereinafter with reference to the drawings.

Figure 1:
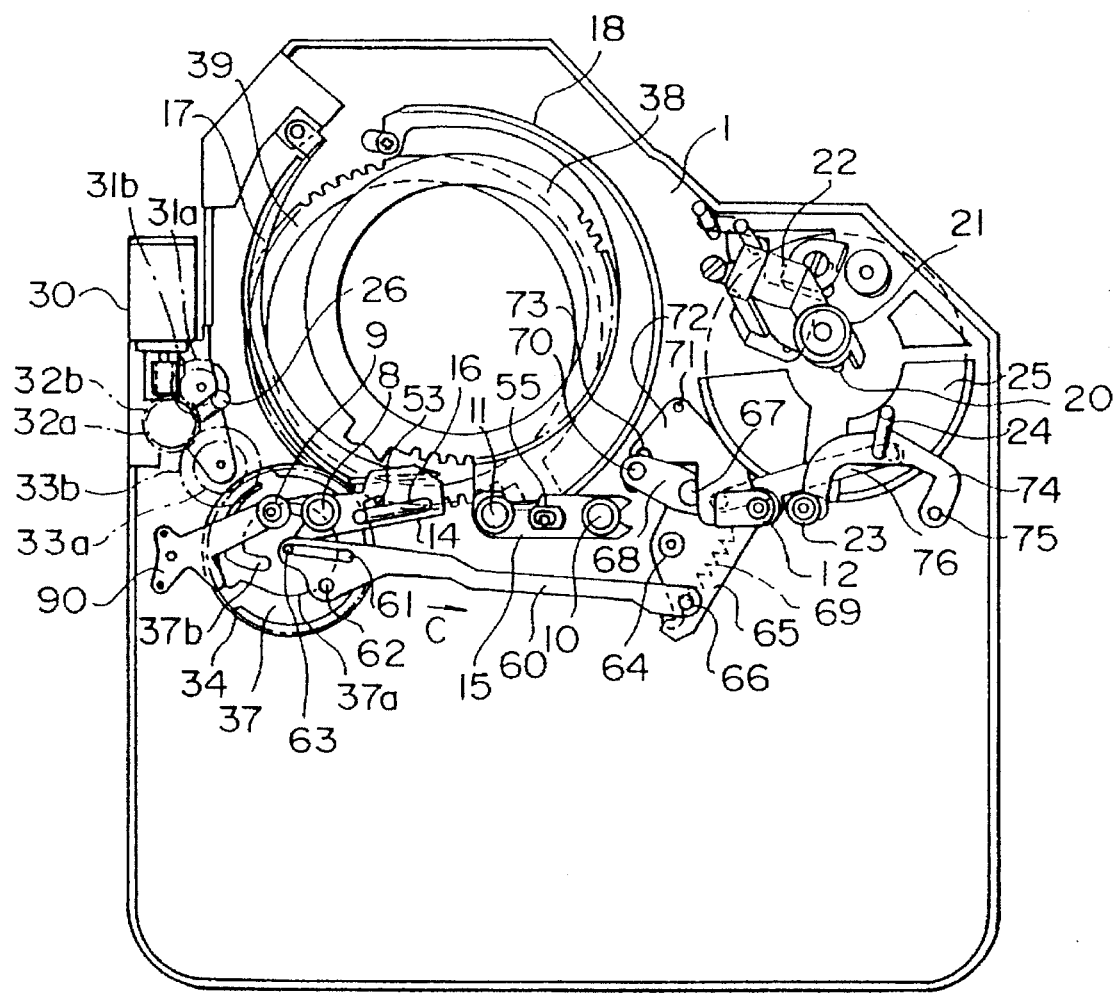
FIG. 1 is a top plan view of a tape guide post driving device in a magnetic recording/playback apparatus according to one embodiment of the present invention before a tape loading operation.
Figure 2:
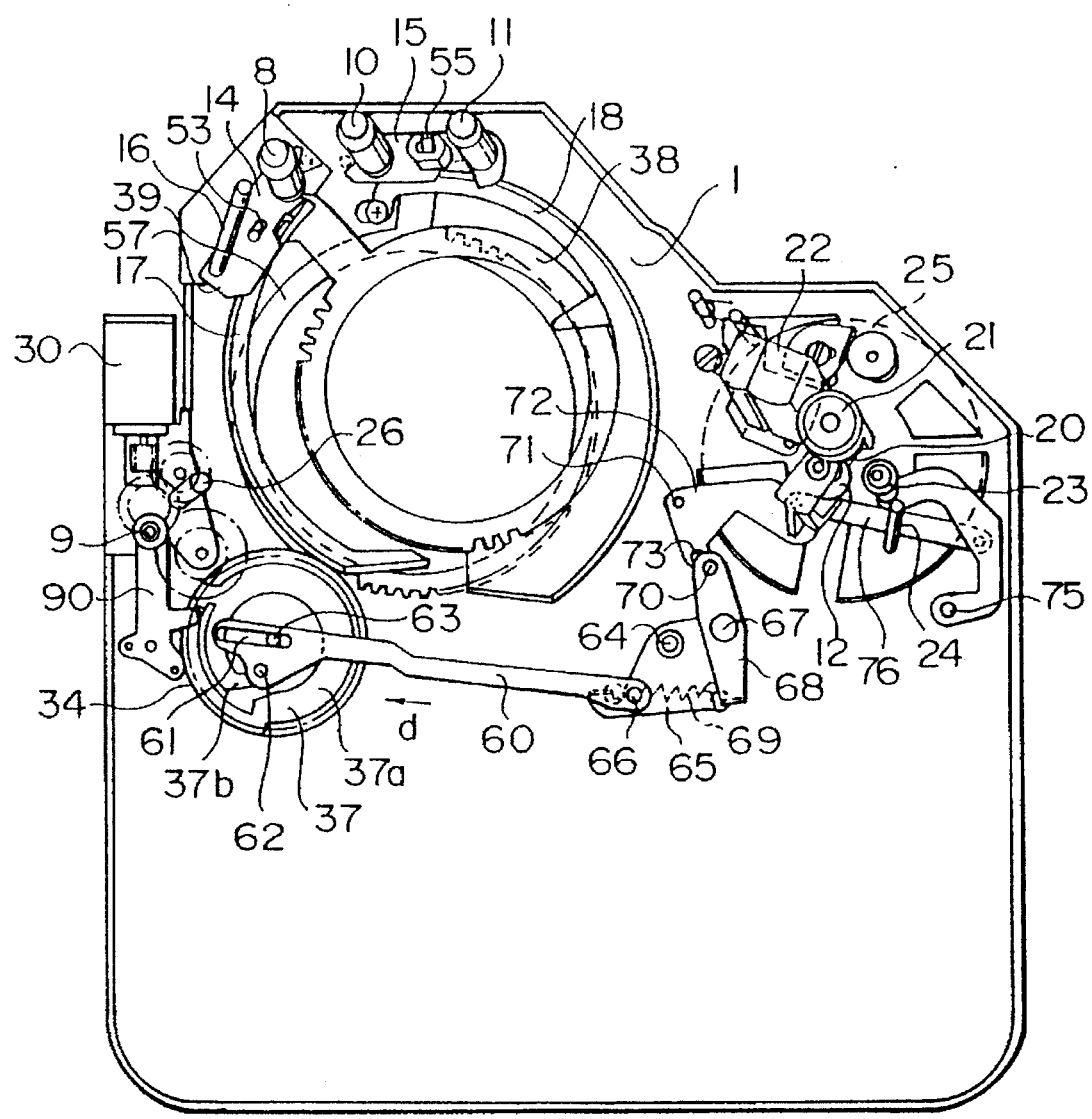
FIG. 2 is a top plan view of the tape guide post driving device in the magnetic recording/playback apparatus according to one embodiment of the present invention after the tape loading operation.
Figure 3:
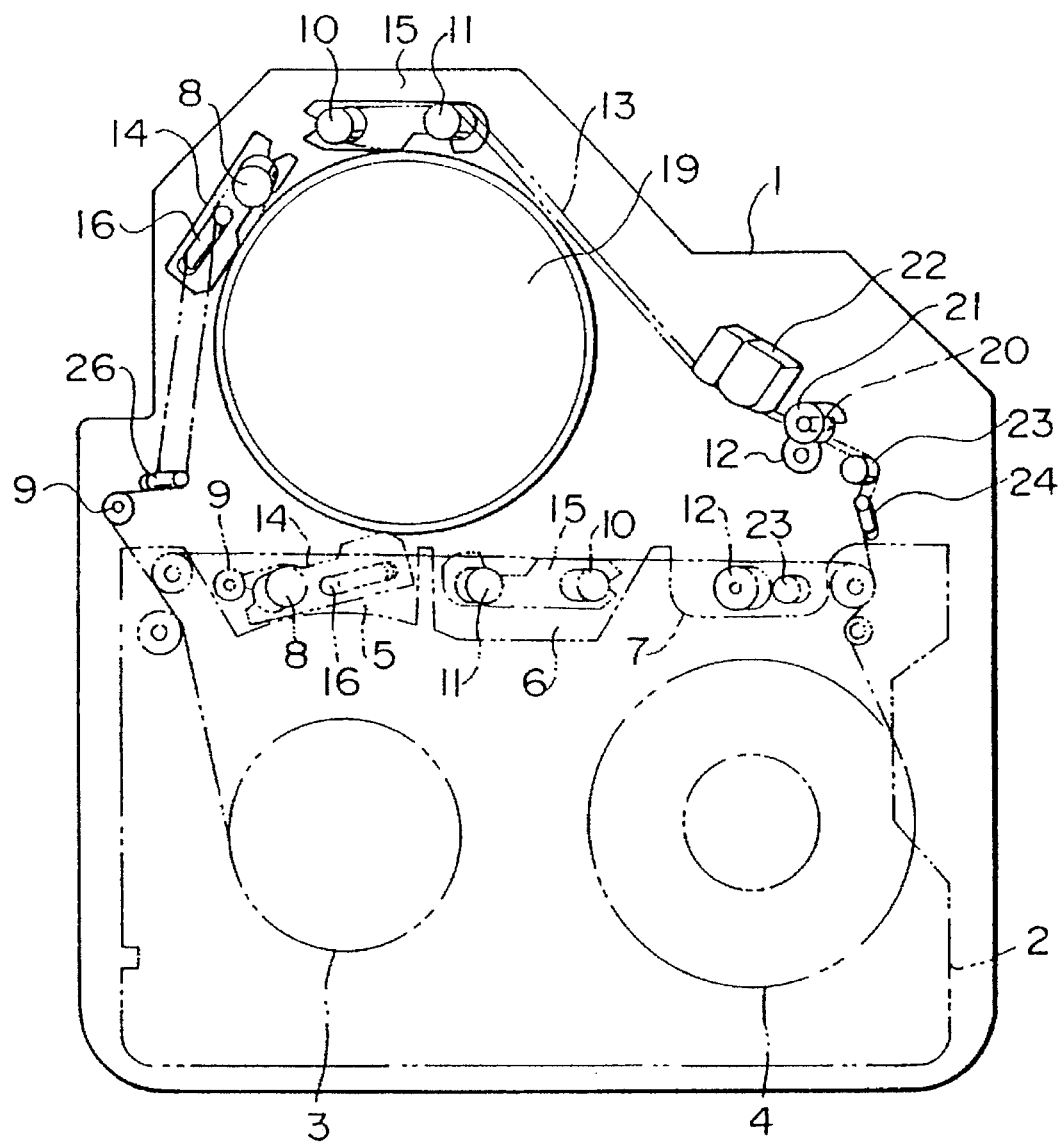
FIG. 3 is a schematic top plan view for explaining a running path of a magnetic tape established by the tape guide post driving device.
Figure 4:
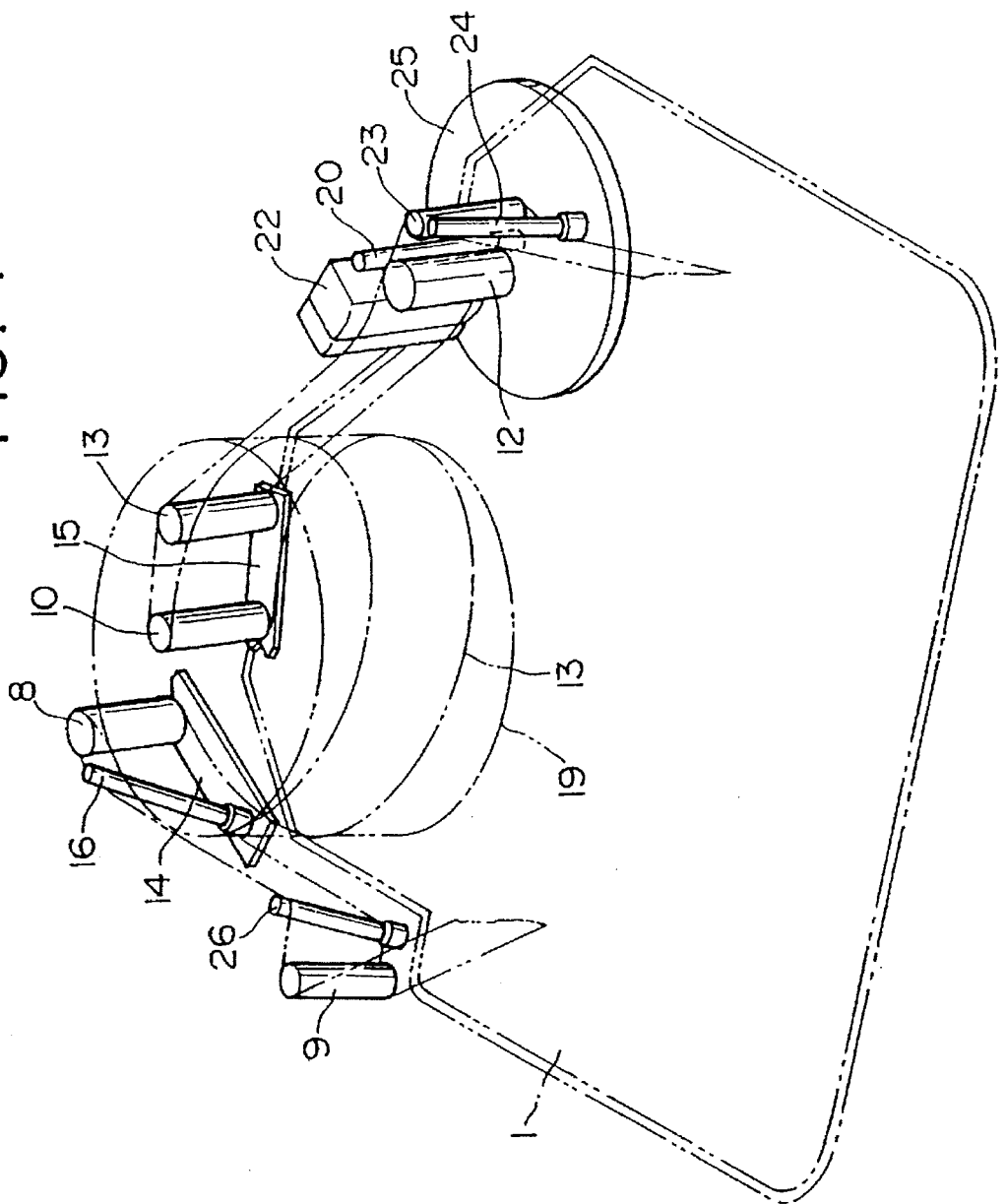
FIG. 4 is a perspective view for explaining the running path of the magnetic tape established by the tape guide post driving device.
Figure 5:
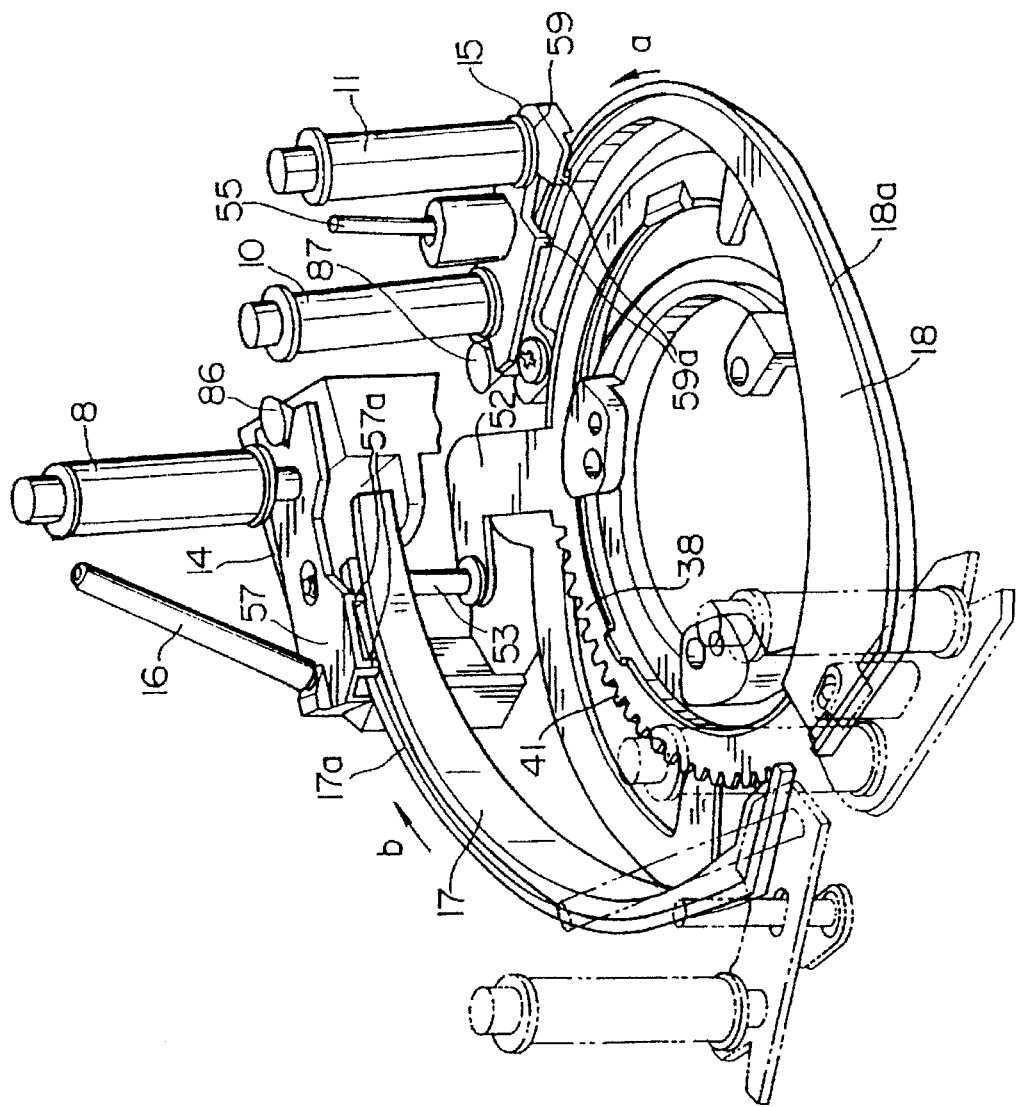
FIG. 5 is a perspective view showing principal parts of a loading post driving device in FIG. 1.
Figure 6:
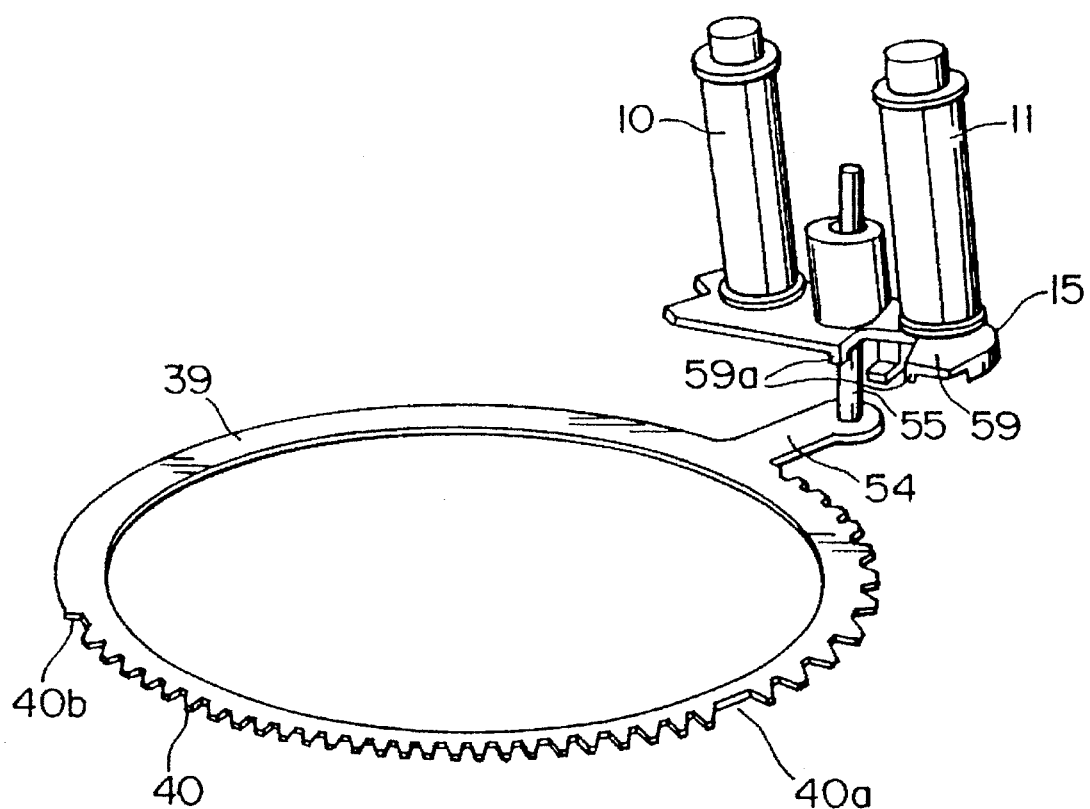
FIG. 6 is a perspective view showing principal parts of the loading post driving device.

FIGS. 1 and 2 are top plan views of a tape guide post driving device in a magnetic recording/playback apparatus according to a first embodiment of the present invention before and after an operation of loading a magnetic tape, respectively. FIG. 3 is a schematic top plan view for explaining a running path of the magnetic tape in the tape guide post driving device. FIG. 4 is a perspective view showing a principal section of the running path and, FIGS. 5 and 6 are perspective views showing principal parts of the tape guide post driving device.

First, an operation of a loading post will be briefly explained by referring to FIGS. 1 to 4. In FIGS. 3 and 4, denoted by the reference numeral 1 is a chassis and 2 is a tape cassette charged on the chassis 1. A supply reel 3 and a take-up reel 4 are provided in the tape cassette 2. When the tape cassette 2 is charged on the chassis 1, a loading roller post 8 at the supply side, a tension post 9 and an inclined post 16; first and second loading roller posts 10, 11 at the take-up side; and a pinch roller 12 and an auxiliary guide post 23 are positioned inside of a magnetic tape 13 and in recessed portions 5, 6, 7 formed in the front surface of the tape cassette 2, respectively.

Denoted by the reference numerals 14, 15 are a boat at the supply side and a boat at the take-up side on which the supply side loading roller post 8 and the take-up side first and second loading roller posts 10, 11 are mounted upwardly, respectively. The supply side boat 14 is also provided with the inclined post 16, in addition to the supply side loading roller post 8, the inclined post 16 being inserted into the recessed portion 5 along with the supply side loading roller post B.

Denoted by the reference numeral 17, 18 are an arc shape loading guide at the supply side and an arc shape leading guide at the take-up side both disposed along the circumference of a rotary head cylinder 19 as shown in FIGS. 1 and 2, the guides 17, 18 operating to guide the supply side boat 14 and the take-up side boat 15 during an operation of loading the magnetic tape 13, respectively. As shown in FIG. 3, the supply side loading guide 17 is arranged in such a manner that it becomes higher as it comes closer to a position where the tape loading operation is completed, and the take-up side loading guide 18 is arranged in such a manner that it becomes lower as it comes closer to a position where the tape loading operation is completed.

The rotary head cylinder 19 is attached substantially vertically with respect to the chassis 1. When the supply side boat 14 is moved along the supply side loading guide 17, the supply side loading roller post 8 winds the magnetic tape 13 withdrawn out of the supply reel 3 around the rotary head cylinder 19 in a direction extending obliquely upwardly toward the left side as viewed in FIG. 4. When the take-up side boat 15 is moved along the take-up side loading guide 18, the take-up side loading roller post 10 winds the magnetic tape 13 withdrawn out of the take-up reel 4 around the rotary head cylinder 19 in a direction extending obliquely downwardly toward the right side as viewed in FIG. 4.

At this time, the supply side loading roller post 8 is in a posture of being inclined slightly backwards at the position where the tape loading operation is completed, because of the slope of the loading guide 17 which becomes gradually greater toward that loading terminal position; and the take-up side first and second loading roller posts 10, 11 are in postures of being inclined slightly forwardly at the other position where the tape loading operation is completed, because of the slope of the loading guide 17 which becomes gradually lower toward that other loading terminal position.

Thus, as shown in FIG. 4, the magnetic tape 13 which is supplied to the rotary head cylinder 19 by means of the supply side loading roller post 8 is introduced from the upper portion of the rotary head cylinder 19 obliquely downwardly toward the lower portion thereof. At a position where the magnetic tape 13 leaves from the rotary head cylinder 19, the magnetic tape 13 is turned so as to be introduced along a gently sloped path of the tape extending obliquely upwardly from the lower portion of the cylinder 19 through the take-up side first loading roller post 10. While being maintained to be slightly inclined forwardly by the take-up side second loading roller post 11, the magnetic tape 13 is introduced obliquely upwardly along the gently sloped path.

Denoted by the reference numeral 20 is a capstan provided on the chassis 1 outside a location where the tape cassette 2 is to be charged, the capstan 20 being supported at its upper and lower ends by bearings 21 and attached to the chassis 1 such that it is inclined relative to the chassis at an angle substantially equal to those of the take-up side loading roller posts 10, 11 at the loading terminal position.

The inclined capstan 20 is brought into full contact with the magnetic tape 13 over is entire width which is introduced obliquely upwardly from the take-up side loading roller post 11 along the sloped path and is inclined forwardly. At the completion of the tape loading operation, the capstan 20 is in press-contact with the pinch roller 12 which is moved from the position of the recessed portion 7 of the tape cassette 2 so that the magnetic tape 13 is held between the capstan 20 and the pinch roller 12 to be driven. Incidentally, the pinch roller 12 is arranged to have an inclination at the same angle as that of the capstan 20 in order to be in full contact with the capstan 20 over entire width of the tape.

Denoted by the reference numeral 22 is an audio-control head provided at a location in the vicinity of the capstan 20 between the take-up side second loading roller post 11 at the loading terminal position and the capstan 20. The audio-control head 22 is attached to the chassis 1 in such a manner that it is inclined at the same angle as that of the capstan 20 in order to facilitate contact between the audio-control head 22 and the magnetic tape 13 which is inclined forwardly and introduced obliquely upwardly along the sloped path from the take-up side second loading roller post 11 to the capstan 20.

Denoted by the reference numeral 23 is an auxiliary guide post which moves in an interlocking relationship with the pinch roller 12 such that it is positioned in the recessed portion 7 of the tape cassette 2, before starting the tape loading operation, and it moves together with the pinch roller 12 at the completion of the tape loading operation, thereby guiding the magnetic tape 13 traveling between the capstan 20 and the pinch roller 12 to take the same toward a fixed inclined post 24. As regards the magnetic tape 13 fed from the take-up side second loading roller post 11 through the capstan 20 and the auxiliary guide post 23 while maintaining the forwardly-inclined posture, torsion of the magnetic tape 13 generated when the tape travels from the sloped path into a horizontally running path is corrected by the fixed inclined post 24 which is slantingly attached to the chassis 1 before the magnetic tape 13 reaches the tape cassette 2, then permitting the magnetic tape 13 to be wound around the take-up reel 4 of the tape cassette 2. Denoted by the reference numeral 25 is a capstan motor for driving the capstan 20, the motor 25 being inclinedly fixed to the chassis 1. With such an arrangement, it becomes unnecessary to provide the capstan 20 below the position where the tape cassette 2 is to be charged. Therefore, a thickness of the chassis 1 is restricted, so that it is readily possible to realise a thin magnetic recording/playback apparatus.

Next, the description concerning a driving mechanism for the loading posts in the magnetic recording/playback apparatus according to one embodiment of the present invention will be given below.

Figure 7A:
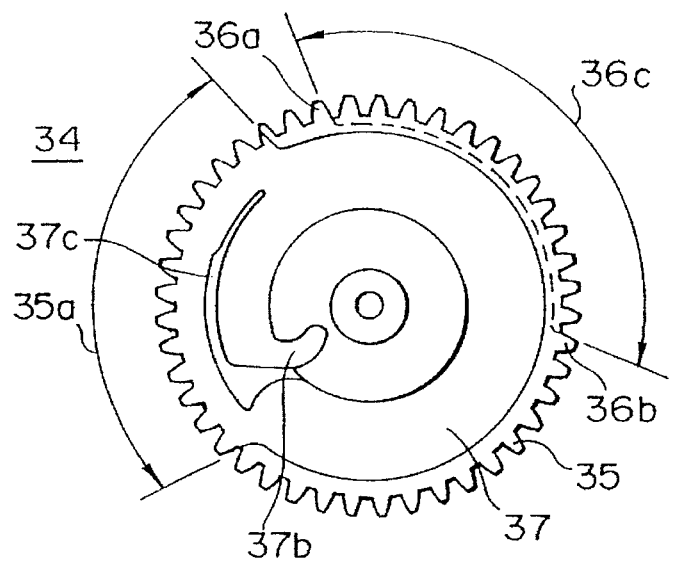
FIG. 7A is a top plan view of a cam gear in the loading post driving device.
Figure 7B:
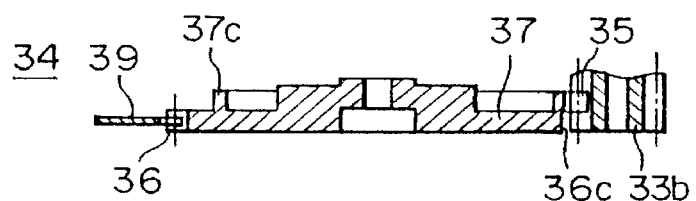
FIG. 7B is a cross-sectional view of the cam gear in the loading post driving device.
Figure 7C:
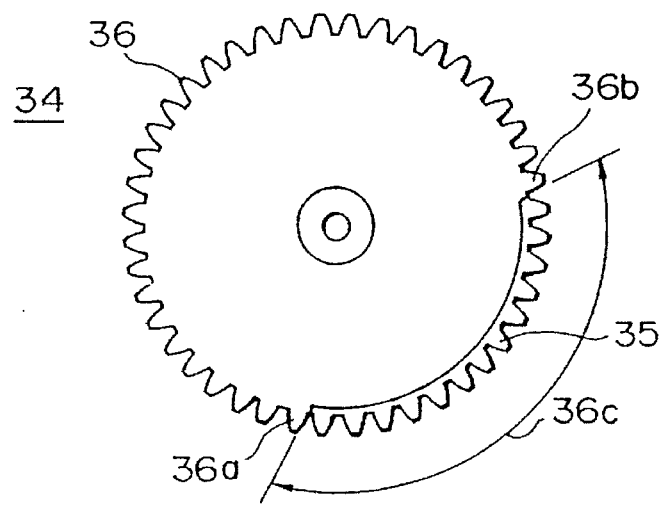
FIG. 7C is a bottom view of the cam gear in the loading post driving device.

Referring again to FIG. 1, the driving force of a loading motor 30 is transmitted to a cam gear 34 through a dual gear comprising gears 31a, 31b, a dual gear comprising gears 32a, 32b and a dual gear comprising gears 33a, 33b. As shown in FIGS. 7A, 7B and 7C, the cam gear 34 is formed in its upper half with a first intermittent gear section 35 which has a non-toothed portion 35a in its part and is meshed with the gear 33b to transmit the driving force of the loading motor 30, and in its lower half with a second intermittent gear section 36 which has a non-toothed portion 36a in its part and is used for transmitting the driving force to the loading roller posts 10, 11 through a take-up side ring gear 39.

As described above, the first intermittent gear section 35 has the non-toothed 35a which is provided to have a part of a tension regulator arm 90, which is adapted to move the tension post 9 during the tape loading operation, abut against a cam wall 37c provided on the first intermittent gear portion 35. Insofar as the tension regulator arm 90 can be controlled by any other means, the first intermittent gear portion 35 may be in the form of a full-toothed gear of which teeth are formed on the entire outer periphery.

Furthermore, a cam portion 37 is formed on the top surface of the cam gear 34 and used for controlling the pinch roller 12 to press-contact with or separate from the capstan 20. Since the first and second intermittent gear portions 35, 36 and the cam portion 37 are integrally formed into the cam gear 34 as one piece, the thickness of the cam gear 34 can be reduced.

The mechanism for driving the loading roller posts 8, 10, 11 by the second intermittent gear portion 36 of the cam gear 34 will now be described with reference to FIG. 9 which is a top plan view of a gear train. Denoted by the reference numeral 38 is a ring gear at the supply side for driving the supply side loading roller post 8 and 39 is a ring gear at the take-up side for driving the take-up side loading roller posts 10, 11, these ring gears 38, 39 being provided below the rotary head cylinder 19 in such a manner that the center points of rotation of the ring gears are offset from each other. A toothed section 40 extending over a predetermined range on the outer periphery of the take-up side ring gear 39 is arranged so as to mesh with the second intermittent gear portion 36 of the cam gear 34. There are respectively provided first and second non-toothed portions 40a and 40b at intermediate and rear and portions of the toothed section 40 when viewed in a direction of an arrow which corresponds to a direction of rotation of the ring gear 39 during loading the magnetic tape, the first and second non-toothed portions being capable of engaging with or disengaging from terminal ends 36a and 36b of the second intermittent gear portion 36 for the purpose of ensuring the start-up of the loading operation.

A toothed section 41 extending over a predetermined range on the outer periphery of the supply side ring gear 36 is cooperatingly connected with the toothed section 40 of the supply side ring gear 39 through an intermediate gear 42, one gear 43a of a dual pendulum gear 43 held in mesh with the intermediate gear 42, and the other gear 43b of the pendulum gear 43. The intermediate gear 42 and the pendulum gear 43 are pivotally mounted on a swing plate 45 which is swingably attached at its one end to a shaft 44 provided on the chassis 1. A shaft 47 which is mounted upright on the chassis 1 is fitted into an elongated opening 46 formed at the other end of the swing plate 45 in order to control swinging movement of the plate 45.

Figure 11:
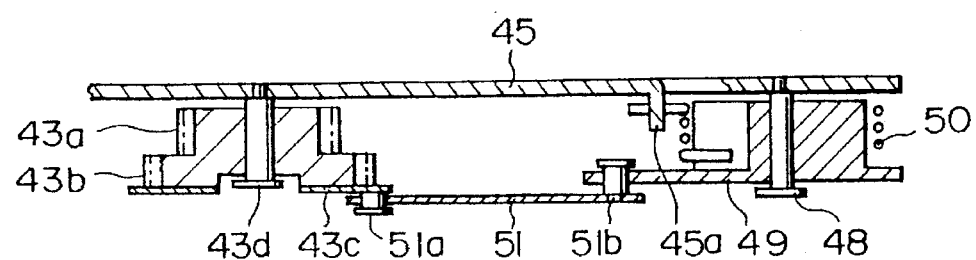
FIG. 11 is a cross-sectional view showing an arrangement of a swing plate in the loading post driving device.

Also as seen from a cross-sectional view of FIG. 11, the pendulum gear 43 is provided integrally with a plate 43c. Denoted by the reference numeral 49 is a charge arm turnably supported by a shaft 48 which is mounted upright on the swing plate 45, with a torsion coil spring 50 fitted around the outer circumference of the shaft 48. The torsion coil spring 50 has one end secured to the charge arm 49 and the other end secured to a bent portion 43a of the swing plate 45. As a result, the charge arm 49 is always urged to turn in a direction of an arrow A in FIG. 9.

Denoted by the reference numeral 51 is a link which has one end rotatably connected with the plate 43c by a pin 51a and the other end rotatably connected with the charge arm 49 by a pin 51b.

Figure 9:
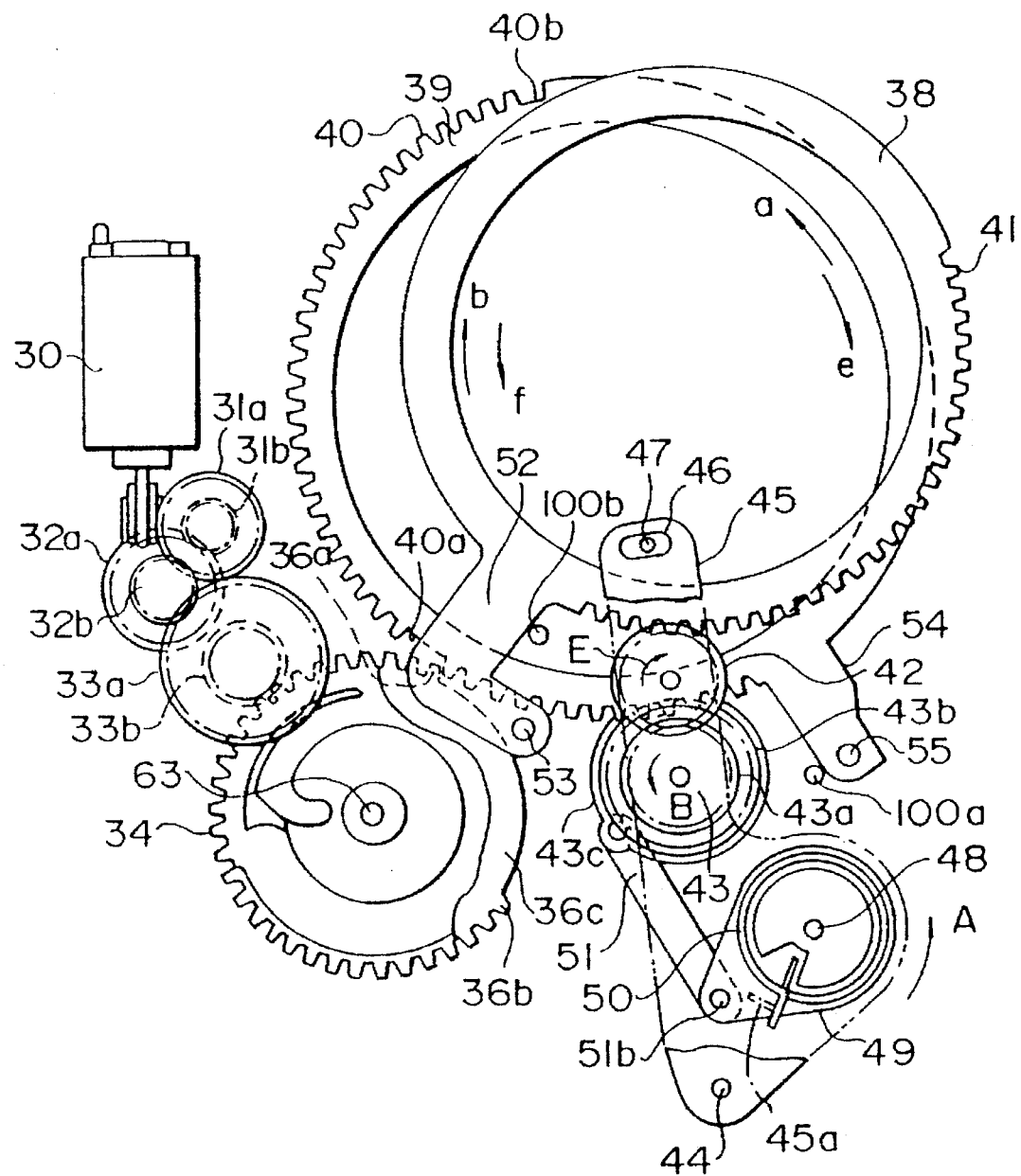
FIG. 9 is an explanatory view showing one state of a drive gear train in a process of the tape loading operation in the loading post driving device.

With such an arrangement, the pendulum gear 43 is always urged through the link 51 to rotate in a direction of an arrow B in FIG. 9. It is needless to say that while the pendulum gear 43 is making one rotation, the charge arm 49 performs reciprocal swinging movement about the shaft 48.

The supply side ring gear 30 is provided with a fixed arm 52 at the front end of the toothed section 41 thereof when viewed in a direction of an arrow b which corresponds to a direction of rotation of the ring gear 38 during loading the magnetic tape. The fixed arm 32 has a drive shaft 53 at the supply side which is mounted upright at the distal and portion of the fixed arm 52. The take-up side ring gear 39 is provided with a fixed arm 54 at the front end of the toothed section 40 thereof when viewed in the direction of the arrow a which corresponds to the direction of rotation of the ring gear 39 during loading the magnetic tape. The fixed arm 54 has a drive shaft 55 at the take-up side which is mounted upright at the distal end portion of the fixed arm 54. As will be seen from FIG. 5, the supply side boat 14 is vertically movable attached to the supply side drive shaft 53. The supply side boat 14 includes at its rear end a holder portion 57 adapted to engage with a stepped portion 17a provided along the outer periphery of the supply side loading guide 17. The holder portion 57 has a pair of claws 57a adapted to engage with the lateral face of the stepped portion 17a. Thus, the supply side boat 14 is guided along the supply side loading guide 17.

Likewise, as will be seen from FIGS. 5 and 6, the take-up side boat 15 is vertically movably attached to the take-up side drive shaft 55. The take-up side boat 15 includes at its rear end a holder portion 59 adapted to engage with a stepped portion 18a provided along the outer periphery of the take-up side loading guide 18. The holder portion 59 has a pair of claws 59a adapted to engage with the lateral face of the stepped portion 18a. Thus, the take-up side boat 15 is guided along the take-up side loading guide 18.

The supply side drive shaft 53 and the take-up side drive shaft 55 are designed so as to move along the outer peripheries of the supply side loading guide 17 and the take-up side loading guide 18, each having an arc shape, when the supply side ring gear 38 and the take-up side ring gear 39 rotate in the direction of the arrow b and in the direction of the arrow a during loading the magnetic tape, respectively. In this way, the supply side boat 14 and the take-up side boat 15 are guided stably without disengaging from the outer peripheries of the supply side loading guide 17 and the take-up side loading guide 18; respectively, in course of the loading operation of the tape. Moreover, the supply side boat 14 is forced to gradually rise higher as it comes nearer to the loading terminal position, while the take-up side boat 15 is forced to be gradually lowered as it comes closer to the loading terminal position.

Figure 12:
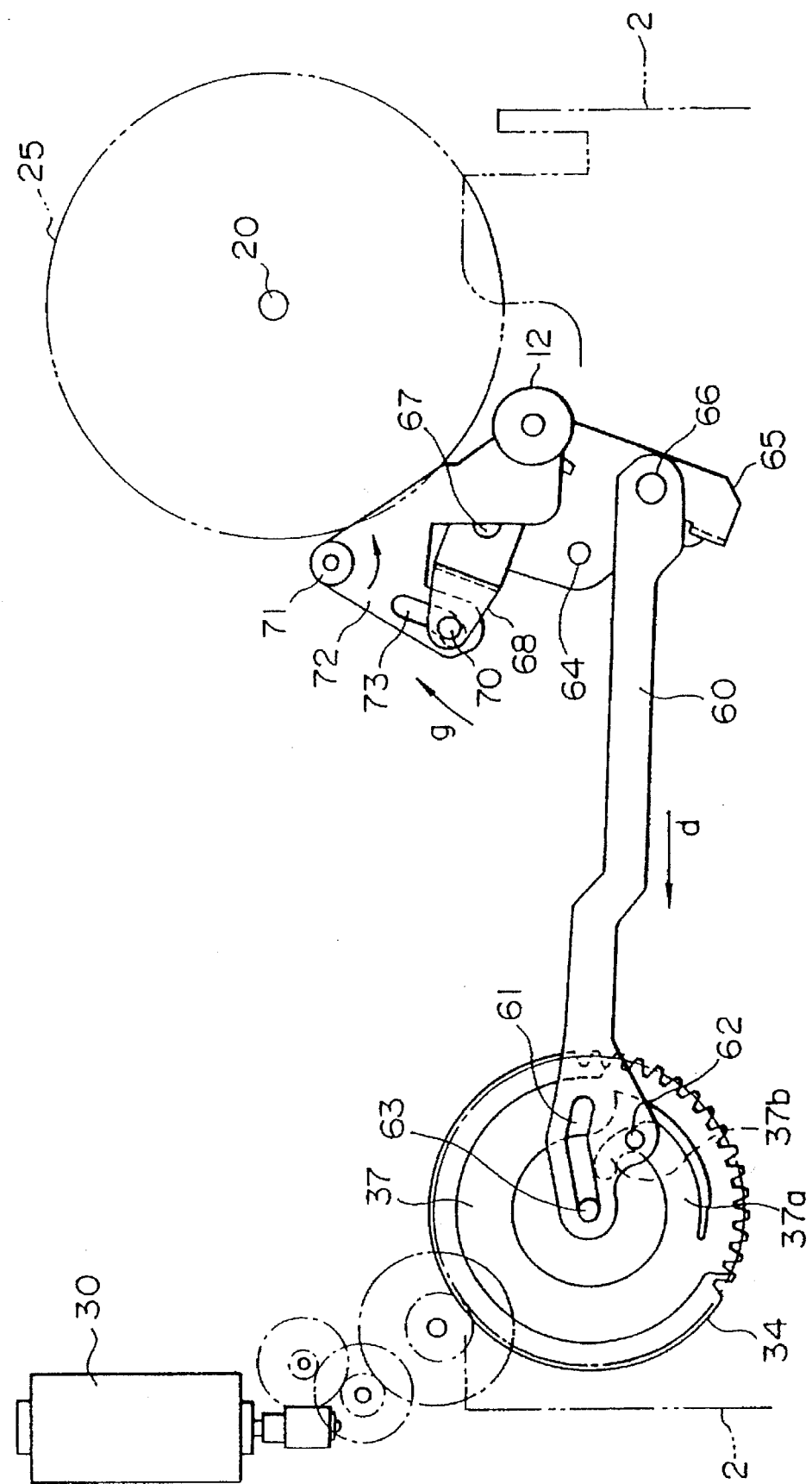
FIG. 12 is a top plan view showing an operation in which a pinch arm is driven by a cam gear in the tape guide post driving device.
Figure 12A:
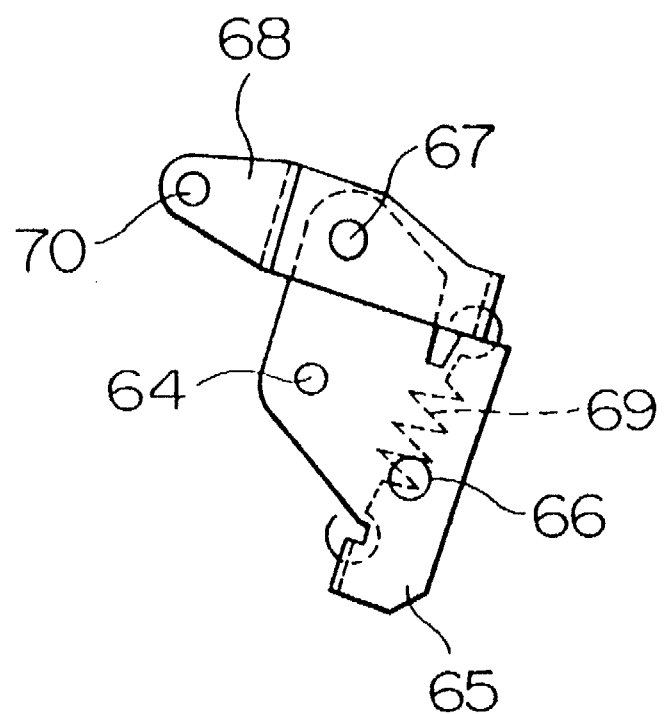
FIG. 12A is a top plan view of first and second pinch charge arms.
Figure 13:
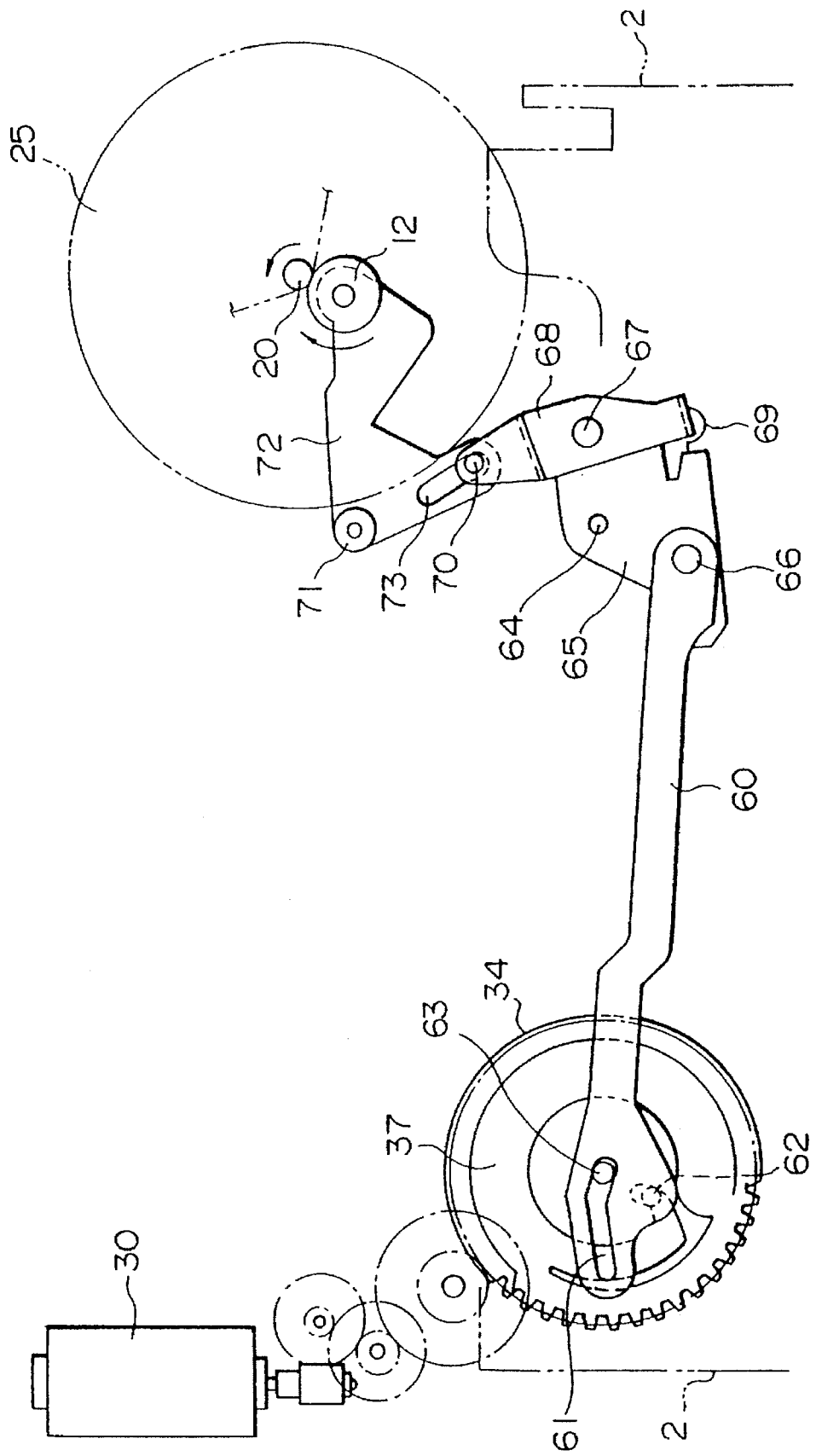
FIG. 13 is a top plan view showing the operation in which the pinch arm is driven by the cam gear in the tape guide post driving device.
Figure 14:
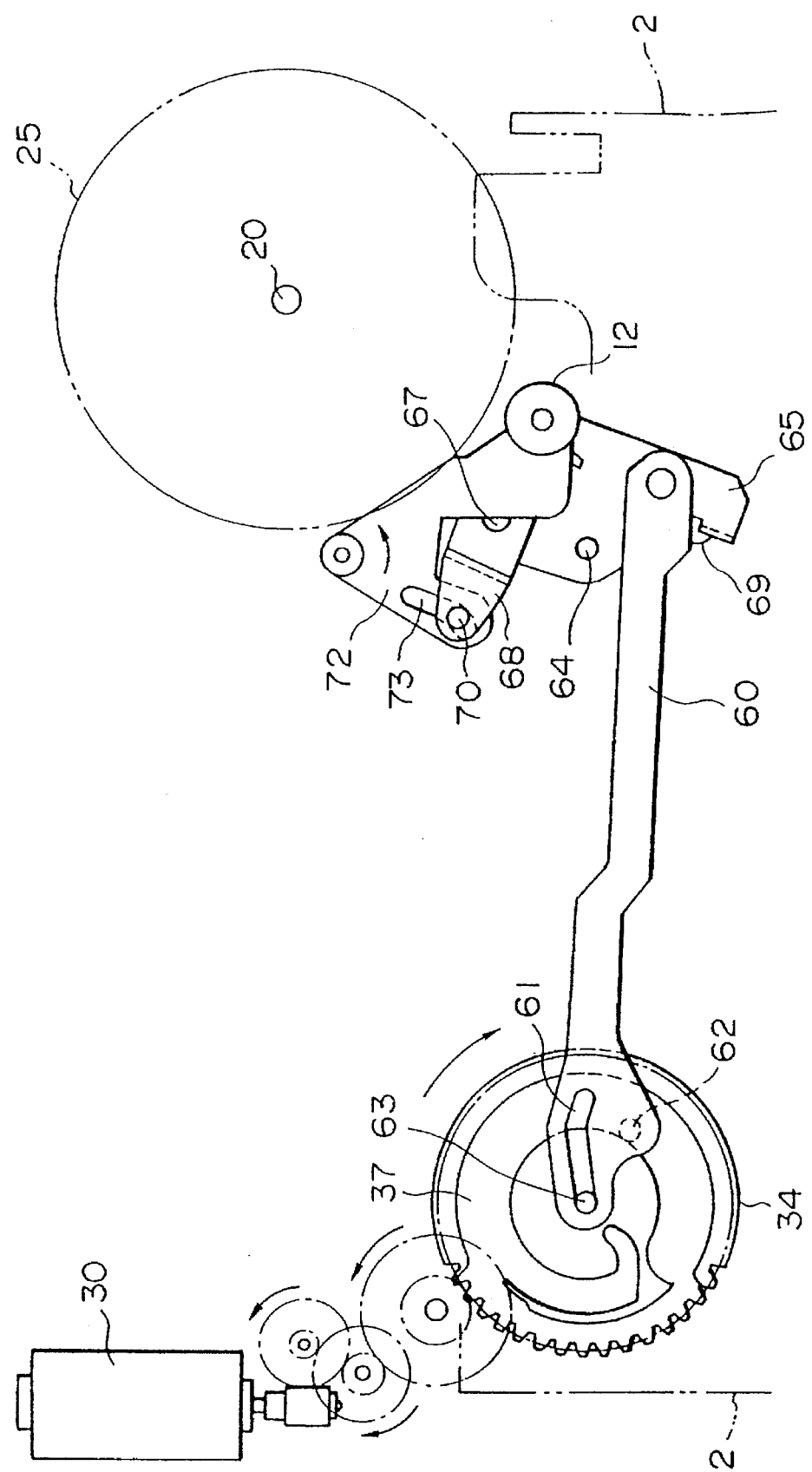
FIG. 14 is a top plan view showing the operation in which the pinch arm is driven by the cam gear in the tape guide post driving device.

The mechanism of making the pinch roller 12 presscontact with the capstan 20 through the cam portion 37 of the cam gear 34 will now be described. In FIGS. 12 and 13, the cam portion 37 of the cam gear 34 comprises a cam groove 37a extending in the circumferential direction and a bent cam groove 37b so bent toward the center as to press the pinch roller 12 against the capstan 20 after the tape loading operation. Denoted by the reference numeral 60 is a pinch rod which moves in an interlocking relationship with the cam portion 37 of the cam gear 34, and has at one end an elongated hole 61 extending in a direction of length of the pinch rod 60 and a cam follower 62 adapted to engage with the cam grooves 37a, 37b formed in the cam portion 37. The elongated hole 61 is fitted over a shaft 63 of the cam gear 34. The other end of the pinch rod 60 is connected through a pin 66 with one end of a first pinch charge arm 65 pivotally supported by a shaft 64 mounted upright on the chassis 1. As shown in FIG. 12A, the first pinch charge arm 65 has the other end to which a second pinch charge arm 68 is pivotally supported at its middle portion through a pin 67. A spring 69 is interposed between the one end of the first pinch charge arm 63 and one end of the second pinch charge arm 68. A pin 70 provided at the other end of the second pinch charge arm 68 is fitted into an elongated hole 73 at one end of a pinch arm 72 turnably attached to the chassis 1 through a pin 71, and the pinch roller 12 is attached to the other end of the pinch arm 72 at the same inclination as the capstan 20.

Figure 15A:
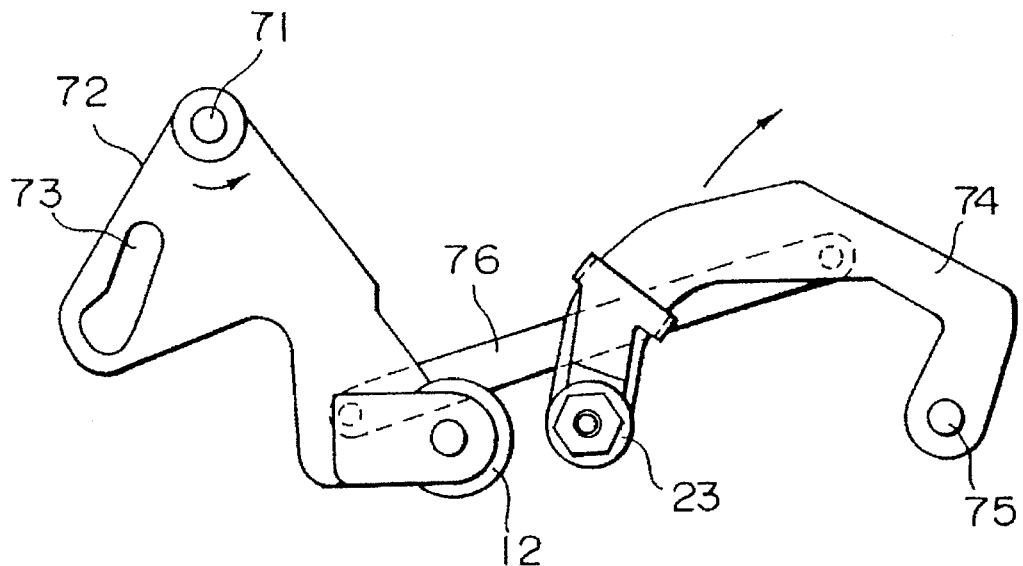
FIG. 15A is a top plan view showing an operation of an auxiliary guide post in the tape guide post driving device.
Figure 15B:
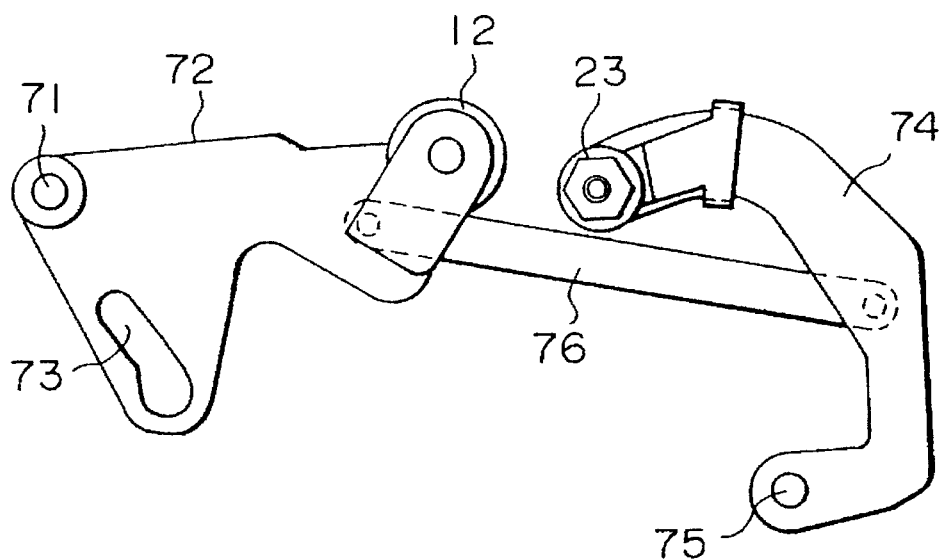
FIG. 15B is a top plan view showing an operation of an auxiliary guide post in the tape guide post driving device.

As shown in FIG. 15, an arm 74 has one end which is pivotally supported by a shaft 75 mounted upright on the chassis 1, and the other end provided with the auxiliary guide post 23 extending upwardly therefrom at the same inclination as the capstan 20.

Further, the arm 74 is connected with the pinch arm 72 via a link 76.

Figure 10:
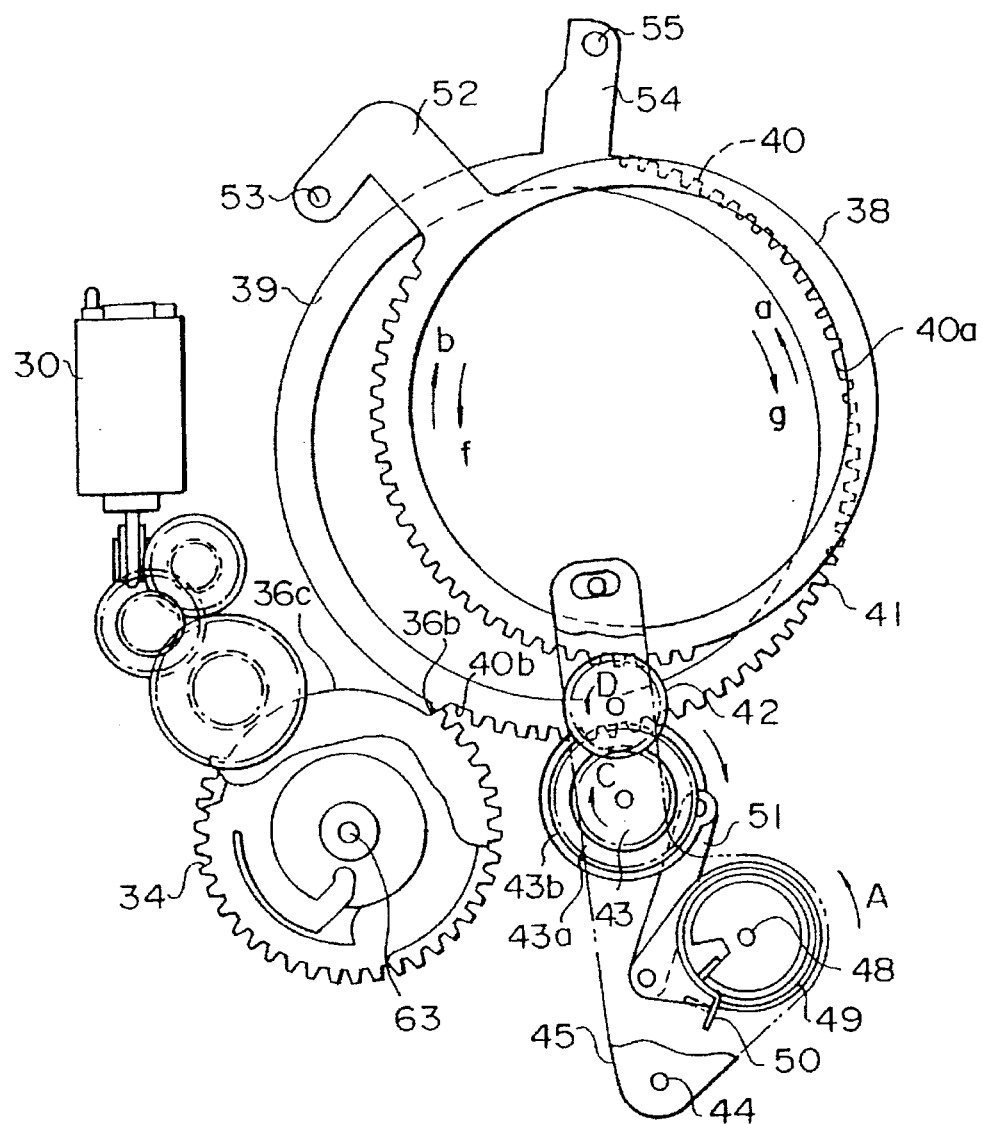
FIG. 10 is an explanatory view showing another state of a drive gear train in a process of the tape loading operation in the loading post driving device.

The operation of loading the magnetic tape by means of the above-mentioned mechanism will be next described in more detail. FIGS. 9 and 10 are explanatory views each showing a state of the gear train in a process of the tape loading operation. FIGS. 1 and 9 illustrate a state of the gear train before starting the tape loading operation. In this state, the supply side boat 14 and the take-up boat 15 are located at unload positions at the beginning ends of the supply side loading guide 17 and the take-up side loading guide 18, respectively. As shown in FIG. 3, the tension post 9, the supply side loading roller post 8 and the inclined post 16 are inserted in the recessed portion 5 of the tape cassette 2; and the take-up side first and second loading roller posts 10, 11 are inserted in the recessed portion 6. Additionally, the pinch rod 60 is forcedly moved in a direction of an arrow c by means of the cam follower 62, so that the pinch roller 12 is retreated at the position most remote from the capstan 20 through the first and second pinch charge arms 65, 68 and the inch arm 72. And, in a similar manner to the pinch roller 12, the inclined guide post 23 is also retreated at the position most remote from the capstan 20 by means of the arm 74 which moves in an interlocking relationship with the pinch roller 12. As a result, as shown in FIG. 3, the pinch roller 12 and the inclined guide post 23 are both inserted in the recessed portion 7 of the tape cassette 2.

As soon as the loading operation is started, as shown in FIG. 9, the cam gear 34 rotates in a clockwise direction, whereupon the second intermittent gear portion 36 is positively meshed with the toothed section 40 of the take-up side ring gear 39 because the terminal end 36a of the second intermittent gear portion 36 is received in the first non-toothed portion 40a of the ring gear 39. Thereafter, the take-up side ring gear 39 rotates in the direction of the arrow a by further rotation of the second intermittent gear portion 36, while the supply side ring gear 38 rotates in the direction of the arrow b through the pendulum gear 43 and the intermediate gear 42 both rotating in an interlocking relationship with the take-up side ring gear 39. Accordingly, the supply side boat 14 is driven in the loading direction by means of the drive shaft 53 provided on the fixed arm 52 of the supply side ring gear 38. At this time, the drive shaft 53 arcuately moves by means of the supply side ring gear 38, while the holder portion 57 of the supply side boat 14 moves linearly along a straight portion at the beginning end of the supply side loading guide 17. Therefore, the supply side boat 14 gradually comes closer to the guide side as the boat 14 moves. After the holder portion 57 of the supply side boat 14 shifts into the circular portion of the supply side leading guide 17, as shown in FIG. 8, the front end portion of the supply side boat 14 moves along the outer periphery of the supply side loading guide 17. Thereafter, the supply side boat 14 is moved stably because it is supported by the drive shaft 53 and the holder portion 57, whereby the magnetic tape 13 is withdrawn out of the tape cassette 2 and wound around the rotary head cylinder 19 uniformly and surely by the supply side loading roller post 2. The take-up side boat 15 is also moved in a manner similar to the supply side boat 14 and thus the description thereof will not be repeated.

In succession with this, just before completing the loading operation when the supply side and take-up side boats 14, 15 abut against respective stoppers 86, 87 shown in FIG. 5, the second intermittent gear portion 36 of the cam gear 34 is not meshed from the toothed section 40 of the take-up side ring gear 39 because the terminal end 36b of the second intermittent gear portion 36 is disengaged from the second non-toothed portion 40b of the ring gear 39, as illustrated in FIG. 10.

In this state, the charge arm 49 being urged to turn in the direction of the arrow A tends to rotate the pendulum gear 43 in a direction of an arrow C through the link 31. This urging torque forces the take-up side ring gear 41 to rotate in the direction of the arrow a, so that the take-up side boat 15 is pressed against the stopper 87 through the take-up side drive shaft 55 for precise positioning. Simultaneously, the urging torque imposed on the pendulum gear 43 in the direction of the arrow C tends to rotate the intermediate gear 42 in a direction of an arrow D, whereby the supply side ring gear 38 is forced to rotate in the direction of the arrow b, so that the supply side boat 14 is pressed against the stopper 86 through the supply side drive shaft 53 for precise positioning.

The leading operation is completed in this way. Even when the timing of pressing the supply side boat 14 against the stopper 86 is somewhat offset from the timing of pressing the take-up side boat 13 against the stopper 87, an adjustment is made by the swing plate 53 slightly swinging in any direction around the shaft 44, so that the supply side boat 14 and the take-up side boat 15 are positively pressed against the stoppers 86 and 87, respectively.

When the cam gear 34 further rotates in the clockwise direction after completing the loading operation, as shown in FIGS. 2, 12 and 13, the cam follower 62 provided on the pinch rod 60 is forced to enter the bent cam groove 37b of the cam portion 37 so as to pull the pinch rod 60 in a direction of an arrow d. As a result, the first pinch charge arm 65 is rotated in the clockwise direction about the shaft 64 to push the second pinch charge arm 69 in a direction of an arrow g. Then, the pinch arm 72 is turned through the pin 70 in counter-clockwise direction about the pin 71 by virtue of the resilient force of the spring 69 to press-contact the pinch roller 12 with the capstan 20.

Therefore, an angle of rotation required for press-contacting the pinch roller 12 with the capstan 20 becomes about 90° in this embodiment, which angle is nearly ½ of that required in the prior art. Further, since the radial length of the cam portion 37 required for press-contacting the pinch roller 12 with the capstan 20 is essentially only about ⅔ of the radius of the cam gear 34 in this embodiment, the size of the cam gear 34 can be reduced to a remarkable extent.

Simultaneously, as shown in FIG. 15, the link 76 is pushed for turning the arm 74 in the clockwise direction about the shaft 75 for locating the auxiliary guide post 23, provided at the one end of the arm 74, to be interposed between the capstan 20 and the inclined post 24 as shown in FIG. 2. Thereby, the gently sloped path of the magnetic tape 13 extending from the take-up side loading roller post 11 to the capstan 20 is favorably maintained.

Meanwhile, because the quantity of information involved in video is several hundred times as much as audio signals, a VTR of the above construction requires such higher mounting accuracy, i.e., on the micron order, for the respective guide posts, the pinch roller, the capstan, etc. than audio recorders. It is the present state of art that even if those components are automatically assembled as designed through a factory line, mount conditions of the respective guide posts, the pinch roller, etc. are finally adjusted (in height) manually. In particular, at the guide post or the like arranged in a region nearer to the trailing end of the tape running system (i.e., arranged on the take-up side relative to the cylinder 19), there is caused a large amount of error including mount errors of those guide posts (such as the tension post 9 and the loading roller post 8) arranged in a region nearer to the beginning end of the tape running system (i.e., at the supply side).

Figure 24:
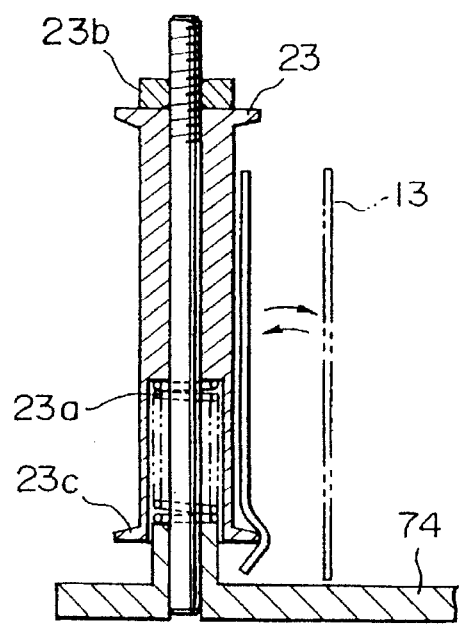
FIG. 24 is a side cross-sectional view of a fixed inclined post in a conventional VTR.

For instance, in FIG. 24 illustrating a side cross-section of the auxiliary guide post 23 shown in FIG. 3, the auxiliary guide post 23 requires a specially high degree of accuracy because it is mounted on the arm 74 which is a moving member. Conventionally, the mount (height) adjustment of the auxiliary guide post 23 has been achieved by, as shown, retaining the auxiliary guide post 23 at an appropriate position by means of a nut 23b (the distal end portion of the auxiliary guide post 23 being threaded) with the aid of the resilient force of a spring 23a inserted inside the post 23.

However, depending on an extent of mount error of the auxiliary guide post 23 (or along with total mount error of the loading mechanism including errors of the supply side posts), it sometimes happens that the auxiliary guide post 23 must be adjusted in its height to be located at a fairly high position relative to the arm 74 as shown, for compensating the error. In such a case, when the magnetic tape 13 is loosened (as indicated by two-dot-chain lines) for some reason and an attempt is made to load the magnetic tape 13 on the auxiliary guide post 23 again by applying a tape tension again, the magnetic tape 13 is not satisfactorily loaded on the auxiliary guide post 23 because the post 23 is positioned at a fairly higher level than the arm 74. Thus, the magnetic tape will not reach the post 23 and come into contact with a lower projection 23c of the post (i.e., one of the projections which are provided at the upper and lower ends of the post to guide the magnetic tape during traveling), resulting in such damage of the tape as peeling of a magnetic material.

In order to prevent such a condition, it is conceivable to shape the lower projection of the post to be directed outwardly (toward the arm side) or to increase the angle of the projection at the inner side for facilitating guiding of the tape from the arm to the post, so that the magnetic tape may be satisfactorily wound around the post even from the loosened condition. But this arrangement deteriprates a characteristic of tape holding (or guiding) while the tape is traveling. It is also conceivable to increase a thickness of the projection itself in a direction toward the arm side, while remaining an inclination of the projection unchanged. With this arrangement, however, the distance between the arm and the post becomes too small to permit a height adjustment in a practical sense.

Figure 25:
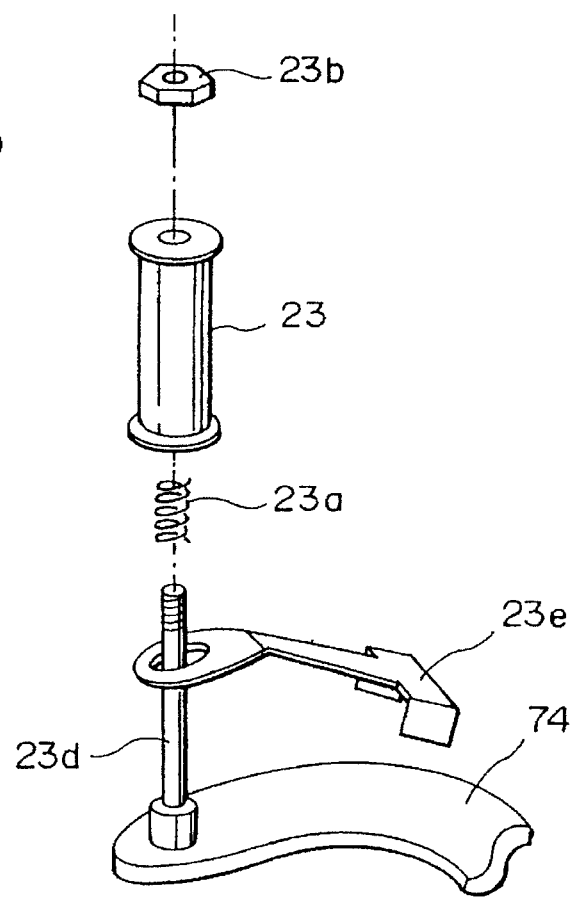
FIG. 25 is an exploded perspective view showing another embodiment of the present invention.
Figure 26:
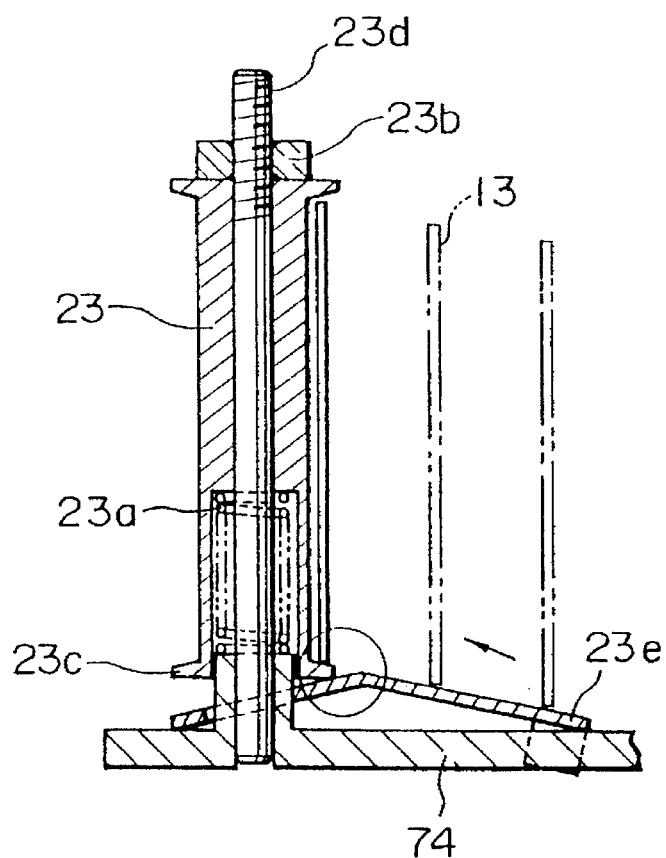
FIGS. 26, 26A and 26B are side cross-sectional views showing another embodiment of FIG. 25.
Figure 27A:
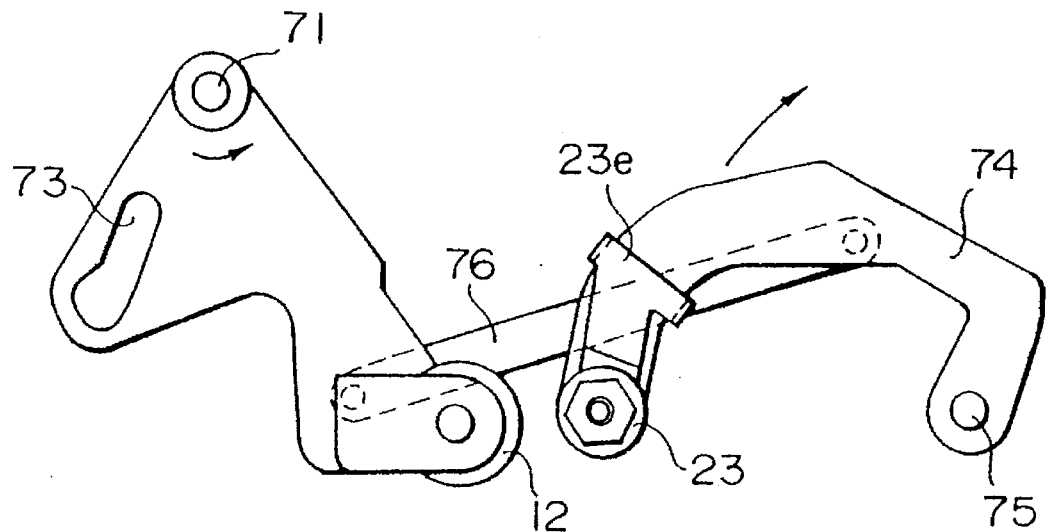
FIGS. 27A and 27B are top plan views of principal parts showing an arrangement in the vicinity of the auxiliary guide post in another embodiment of FIG. 25.
Figure 27B:
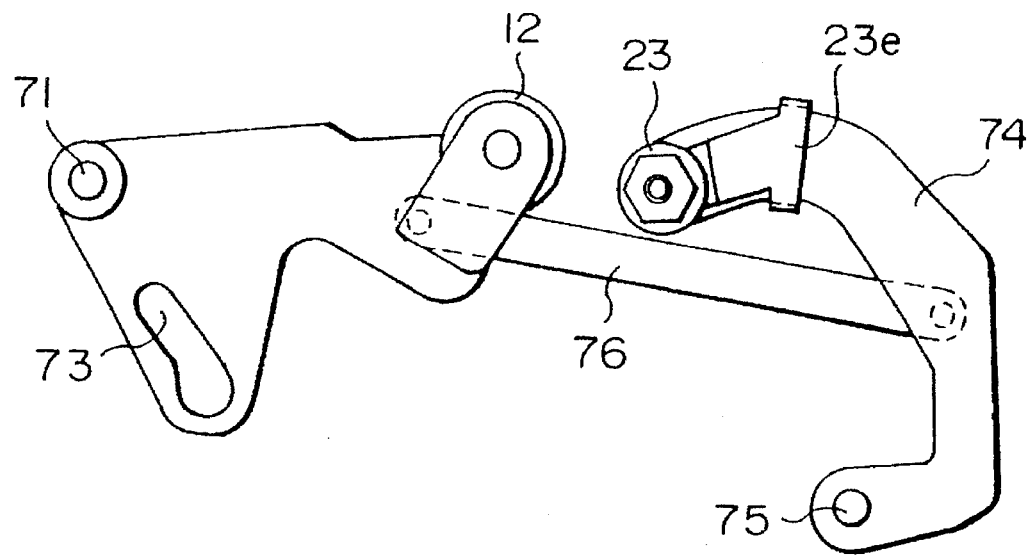

This embodiment proposes the following arrangement with a view of solving the above-mentioned problem. More specifically, as shown in FIGS. 25 to 27, a spring 23a is inserted into the lower portion of the auxiliary guide post 23. Thus, the spring 23a is loosely fitted over a shaft 23d fixed to the arm 74 and having the threaded distal end portion, along with an angled or reversed-V-shaped leaf spring 23e (i.e., a leaf type resilient member having sloped surfaces at opposite sides). The leaf spring 23e is detachably attached at its one end to the arm 74.

Further, a height adjustment of the auxiliary guide post 23 is made by means of the nut 23b with the aid of the resilient force of the spring 23a.

The reason why the spring 23a is inserted inside the auxiliary guide post 23 is that this arrangement enables the height of a VTR body to be reduced by an amount corresponding to the height of the spring 23a as compared with an arrangement of providing the spring 23a outside the auxiliary guide post 23. This is advantageous in camera integrated video apparatus or the like which requires reduction of the size and thickness.

With the proposed arrangement, in an attempt of loading the magnetic tape 13 on the auxiliary guide post 23 again by applying a tape tension again when the tape 13 is slipped off from the auxiliary guide post 23 for some reason, the tape 13 can be loaded on the auxiliary guide post 23 again while sliding over the inclined surface of the angled leaf spring 23e, as shown in FIG. 26.

Figure 26A:
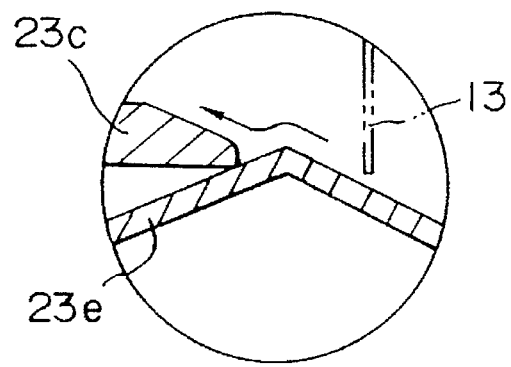
Figure 26B:
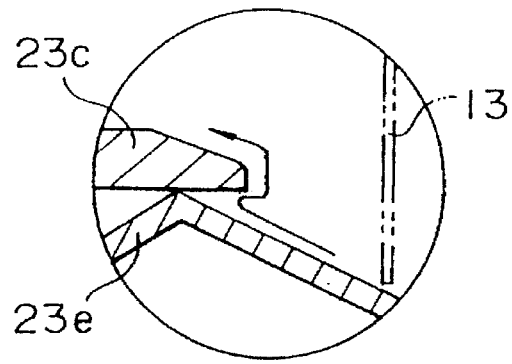

Here, the important point is a contact state of the angled leaf spring 23e with the post projection 23c. In other words, it is vital whether the angled leaf spring 23a contacts with the post projection 23c midway the sloped surface of the leaf spring 23e as shown in FIG. 26A or at the top of the leaf spring 23e as shown in FIG. 26B. In this proposal, the angled leaf spring 23e is arranged such that its sloped surface contacts with the post projection 23c as shown in FIG. 26A. With this arrangement, when the tape 13 is loaded on the post body through the post projection 23c after sliding over the sloped surface of the leaf spring 23e, the tape is loaded while drawing such a locus that it is once sunk after passing the top of the leaf spring 23e and then proceeds along the post projection 23c as indicated by an arrow. On the contrary, with the alternative arrangement that the top of the leaf spring 23e contacts the post projection 23c as shown in FIG. 26B, the lower edge of the tape 13 is about to once move into a gap between the post projection 23c and the sloped surface of the leaf spring 23e, resulting in a fear of damaging the tape 13. Accordingly, the contact state between the angled leaf spring 23e and the post projection 23c is desirably set in such a manner that the sloped surface of the leaf spring 23e contacts with the post projection 23c as shown in FIG. 26A.

Note that while the leaf spring 23e having an angled or reversed-V shape is used in the proposed arrangement, the present invention is not limited thereto and a resilient member of any shape may be used so long as it allows the tape 13 to be smoothly loaded on the post 23 from the arm 74.

Also, while the spring 23a is provided inside the post 23 in addition to the leaf spring 23e in the proposed arrangement, the spring 23a can be dispensed with if the leaf spring 23e has a sufficient degree of resiliency, which contributes to reduction of the weight.

The proposed arrangement is explained by taking the post 23, i.e., the fixed inclined post 23 at the take-up side as shown in FIG. 3, as an example, the present invention is not limited thereto and the above proposal can also be applied to other various posts constituting the tape running mechanism in VTR.

Next, during an operation of unloading the magnetic tape, the cam gear 34 rotates in the counter-clockwise direction in FIG. 10 to release the press-contacting movement of the pinch roller 12. Then, the second intermittent gear portion 36 of the cam gear 34 is positively mashed with the toothed section 40 of the take-up side ring gear 39 because the terminal end 36b of the second intermittent gear portion 36 is received in the second non-toothed portion 40b of the ring gear 39. Accordingly, the take-up side ring gear 39 is rotated in a direction of an arrow g which corresponds to the rotating direction in the unloading operation, while the supply side ring gear 38 is rotated through the pendulum gear 43 and the intermediate gear 42 in a direction of an arrow f which corresponds to the rotating direction in the unloading operation. At the time illustrated in FIG. 9 when the supply side loading roller post 8 and the take-up side loading roller post 10, 11 are received in the recessed portions 5 and 6 of the tape cassette 2, respectively, the second intermittent gear portion 36 of the cam gear 34 can disengage from the toothed section 40 of the take-up side ring gear 39 because the terminal and 36a of the second intermittent gear portion 36 is positioned in the first non-toothed portion 40a of the ring gear 39.

At this time, the charge arm 49 is being urged to turn in the direction of the arrow A by the torsion coil spring 50, thus tending to rotate the pendulum gear 43 in the direction of the arrow B through the link 51.

Accordingly, the take-up side ring gear 39 is forcedly rotated in the direction of the arrow g to be pressed against a stopper 100a, fixedly mounted on the chassis 1, for precise positioning. Simultaneously, the rotating force of the pendulum gear 43 in the direction of the arrow B urges the intermediate gear 42 to rotate in a direction of an arrow B, whereby the supply side ring gear 38 is forcedly rotated in the direction of the arrow f to be pressed against a stopper 100b, fixedly mounted on the chassis 1, for precise positioning.

Thereafter, when the cam gear 34 further rotates in the counter-clockwise direction through about 30° from the state of FIG. 9, the tape cassette 2 is ejected (by means of a not-shown arrangement). It is needless to say that during the above process, the supply side ring gear 38 and the take-up side ring gear 39 are both not rotated from the state of FIG. 9 to maintain their press-positioned states against the stoppers 100a and 100b, respectively.

Next, the description concerning a driving mechanism for the tension post according to one embodiment of the present invention will be given below.

Figure 16:
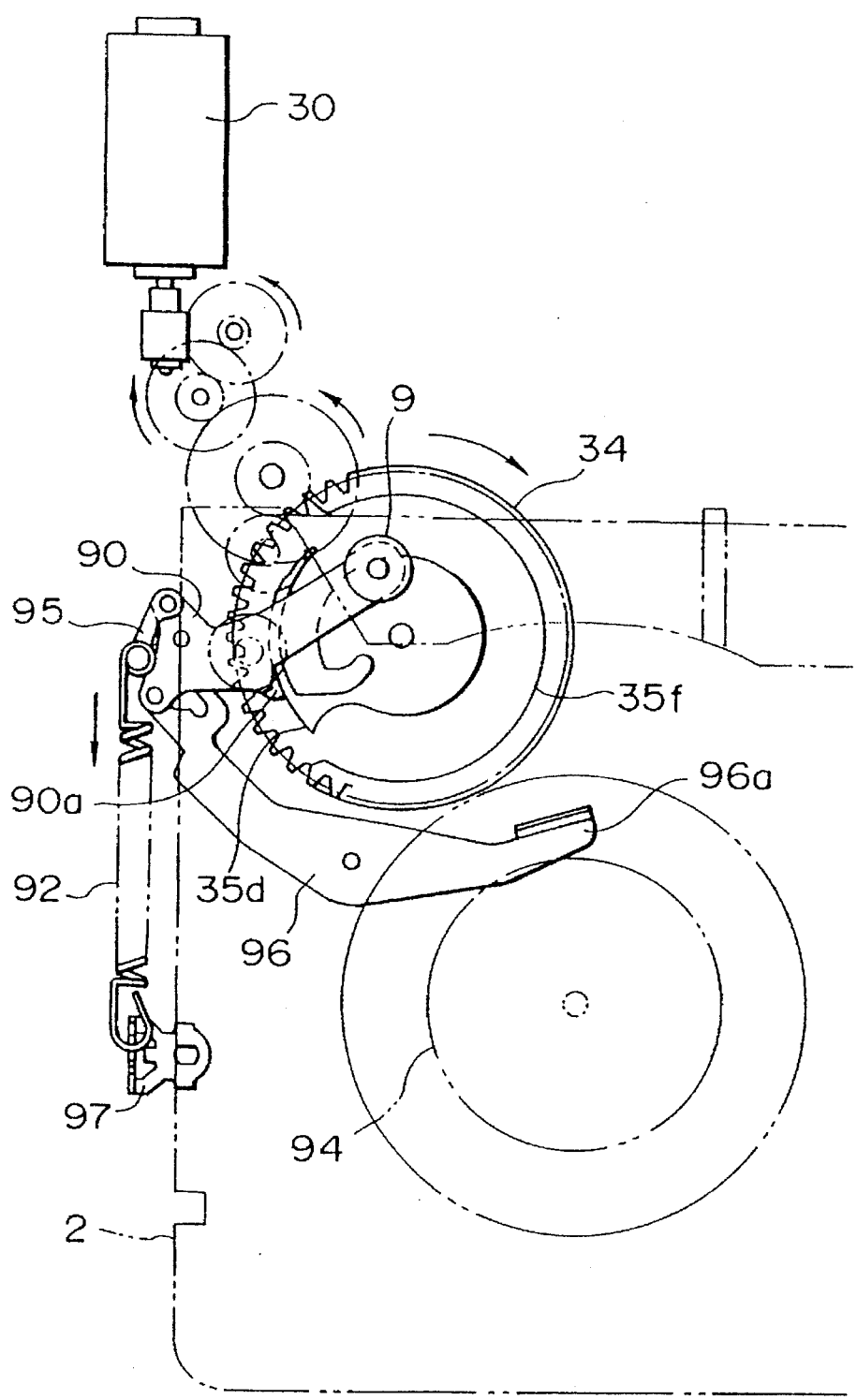
FIG. 16 is a view showing a principal arrangement of the tape guide post driving device before the tape loading operation.
Figure 17:
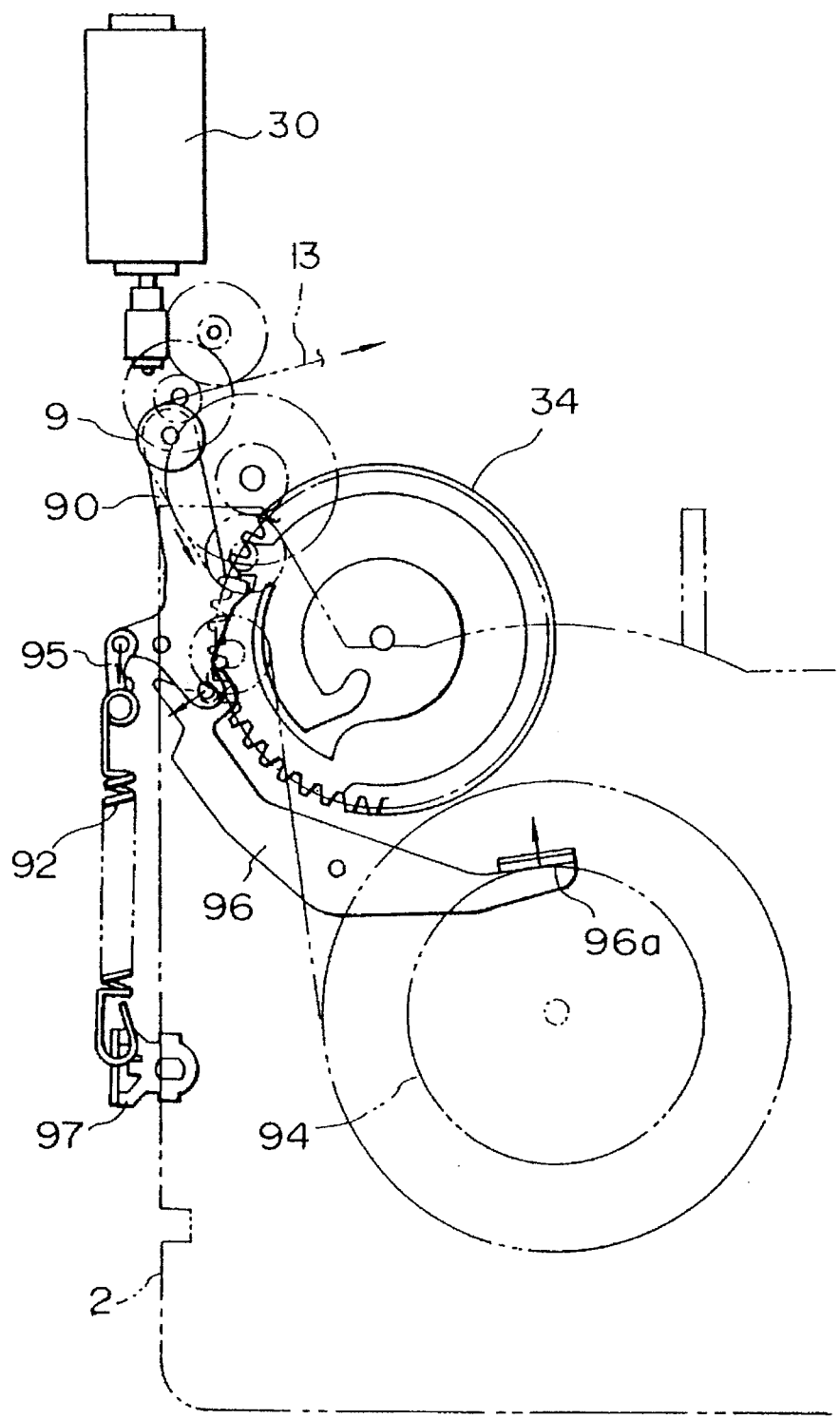
FIG. 17 is a view showing a principal arrangement of the tape guide post driving device after the tape loading operation.
Figure 18:
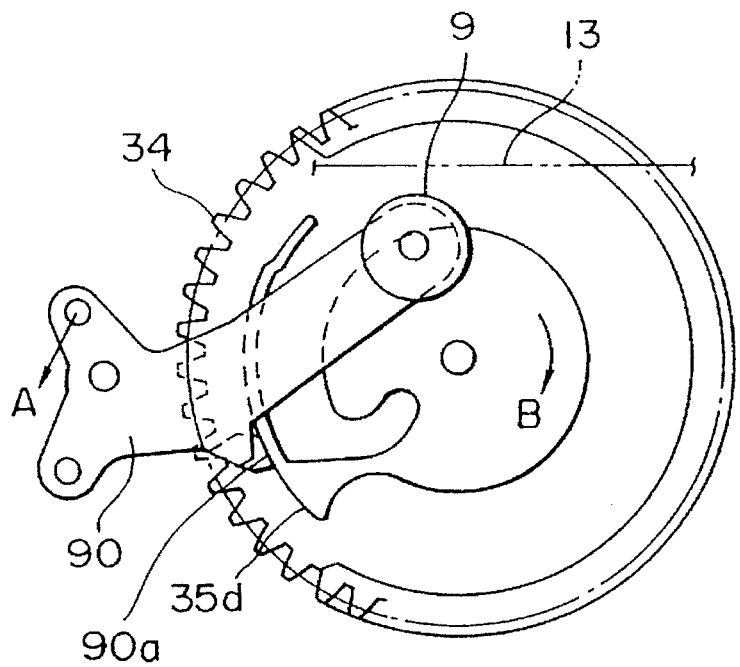
FIG. 18 is an enlarged view showing principal parts of the tape guide post driving device.
Figure 19:
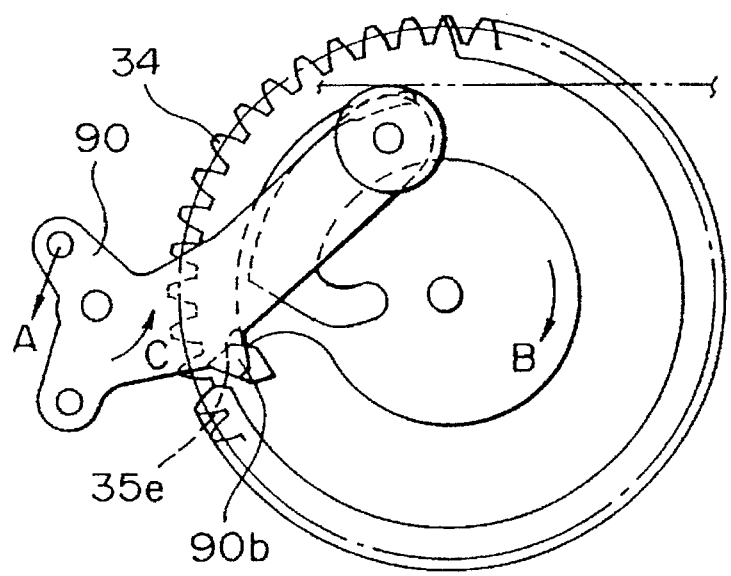
FIG. 19 is an enlarged view showing principal parts of the tape guide post driving device.
Figure 20:
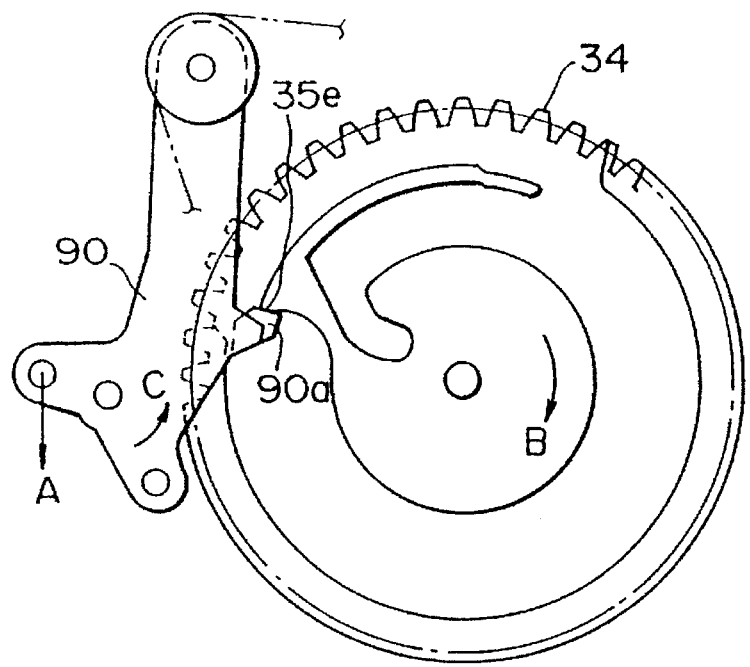
FIG. 20 is an enlarged view showing principal parts of the tape guide post driving device.
Figure 21:
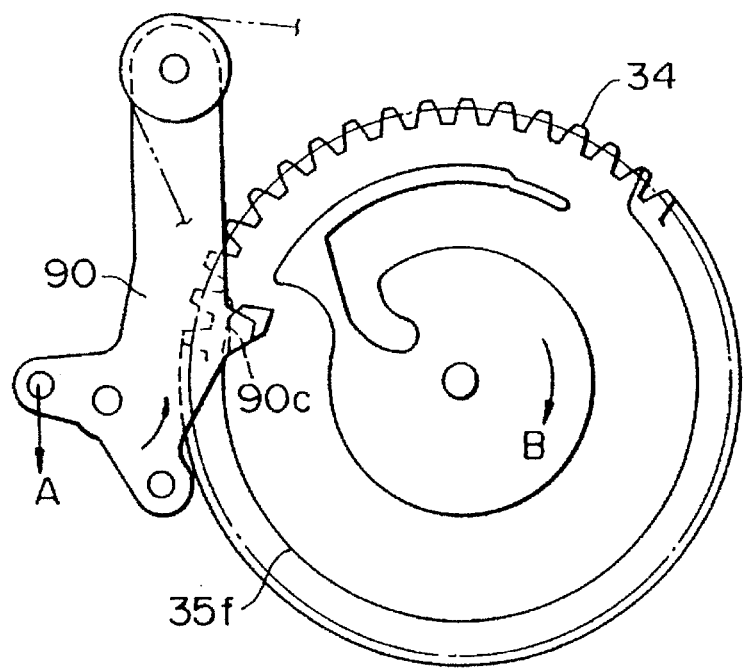
FIG. 21 is an enlarged view showing principal parts of the tape guide post driving device.
Figure 22:
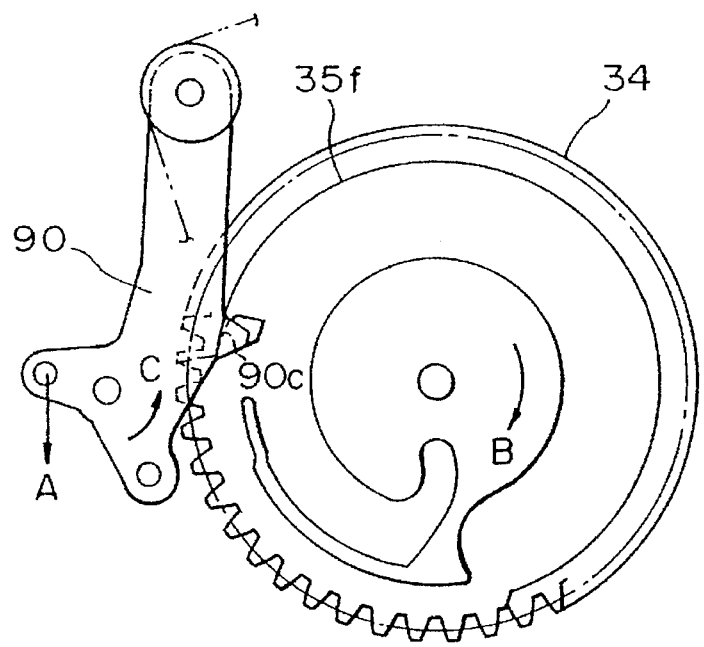
FIG. 22 is an enlarged view showing principal parts of the tape guide post driving device.
Figure 23:
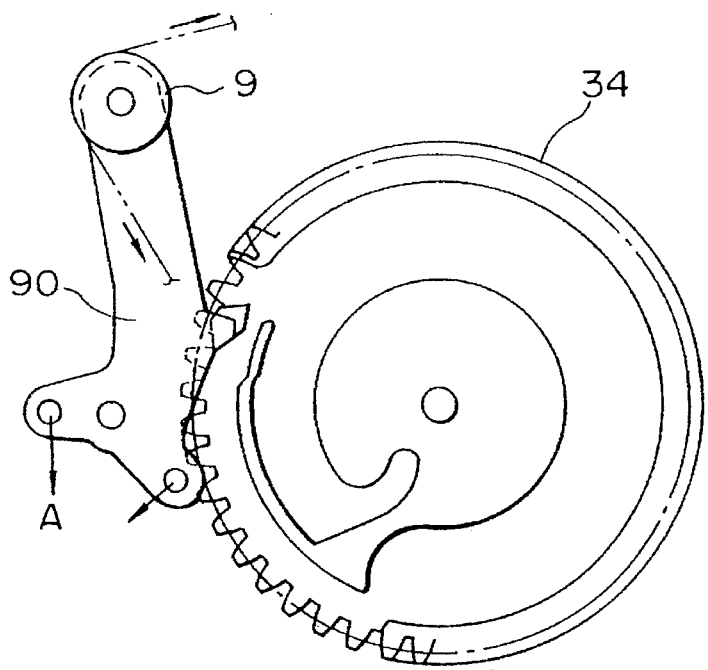
FIG. 23 is an enlarged view showing principal parts of the tape guide post driving device.

In FIGS. 16 and 17, the cam gear 34 and the tension arm 90 are contacted with each other at their cam portions 35d, 90a. As the cam gear 34 rotates, the tension arm 90 is turned while changing the contact point of the cam portion 90a of the tension arm 90 with the cam portions 35d, 35f of the cam gear 34 until the tension post 9 is turned to a tape running position as shown in FIG. 17. Force tending to turn the tension arm 90 is given by the spring force of a tension spring 92 and transmitted to the tension arm 90 through a spring hook 95. When the tension post 9 turns to the tape running position, the cam portion 90a of the tension arm 90 becomes free and, thereafter, the tension arm 90 is balanced by the braking force of a pad 96a of a pad arm 96 contacting with a reel stand 94, the spring force of the tension spring 92, the tensile force of the magnetic tape 13 wound around the tension post 9, thereby controlling a tape tension.

The contact state between the cam portions 90a to 90c of the tension arm 90 and the cam portions 35d to 35f of the cam gear 34 will be explained in detail with reference to FIGS. 10 to 23 for clarifying how the tension arm 90 is turned.

FIG. 10 is an enlarged view of the tension arm 90 and the cam gear 34 in FIG. 16. The tension post 9 is positioned inside the tape cassette and the tension arm 90 is subjected to forces in a direction of an arrow A. The cam gear 34 starts rotation in a direction of an arrow B under a condition that the respective cam portions 90a, 35d are contacted with each other. In a state of FIG. 19, upon the rotation of the cam gear 34 in the direction B, both the members are in contact at their cam portions 90b, 35e and the tension arm 90 starts turning in a direction of an arrow C. In a state of FIG. 20, upon the further rotation of the cam gear 34 in the direction H, both the members are in contact at their cam portions 90a, 35e and the tension arm 90 advances its turning in the direction C. Between the conditions shown in FIG. 21 and FIG. 22, the cam portion 90c of the tension arm 90 is in contact with a wall 35f near the outer periphery of the cam gear 34. In a rate of FIG. 23, the cam portions 90a to 90c of the tension arm 90 are released from contact with the cam portions 35d to 35f of the cam gear 34, so that the tension arm 90 becomes free to have had the tension post 9 rotated to a position where the magnetic tape can run. Accordingly, FIG. 23 corresponds to the enlarged view of the tension arm 90 and the cam gear 34 shown in FIG. 17. It is needless to say that by rotating the cam gear 34 from the state of FIG. 23 in a direction opposite to the direction B, the tension arm 90 can be rotated in a direction opposite to the direction C and the tension post 9 can be returned to the original position inside the cassette. It is also needless to say that the above arrangement may be applied to other unit than the tension arm so long as the unit includes a cam gear and a rotating member rotatable by the cam gear.

As described above, according to the tape guide post driving device of the present invention, the large angle of turn of the tension arm can be ensured in a direct manner without the need of increasing the angle of turn of the tension arm through a separate member. Further, since a cam can be formed in only a region near the outer periphery of the cam gear, a region in the vicinity of the center is available for other uses. Thus, the invention contributes to reduction of the size, weight and thickness of the magnetic recording/playback apparatus to a remarkable extent.

In addition, the present invention makes it possible to greatly reduce the angle of rotation of the cam gear required for the press-contacting operation of the pinch roller, and also greatly shorten the radial length of the cam portion of the cam gear. As a result, the cam gear can be greatly reduced in size, which also contributes to reduction in size of the entire VTR to a remarkable extent.

A second embodiment of the present invention will be described below with reference to the drawings.

Figure 28:
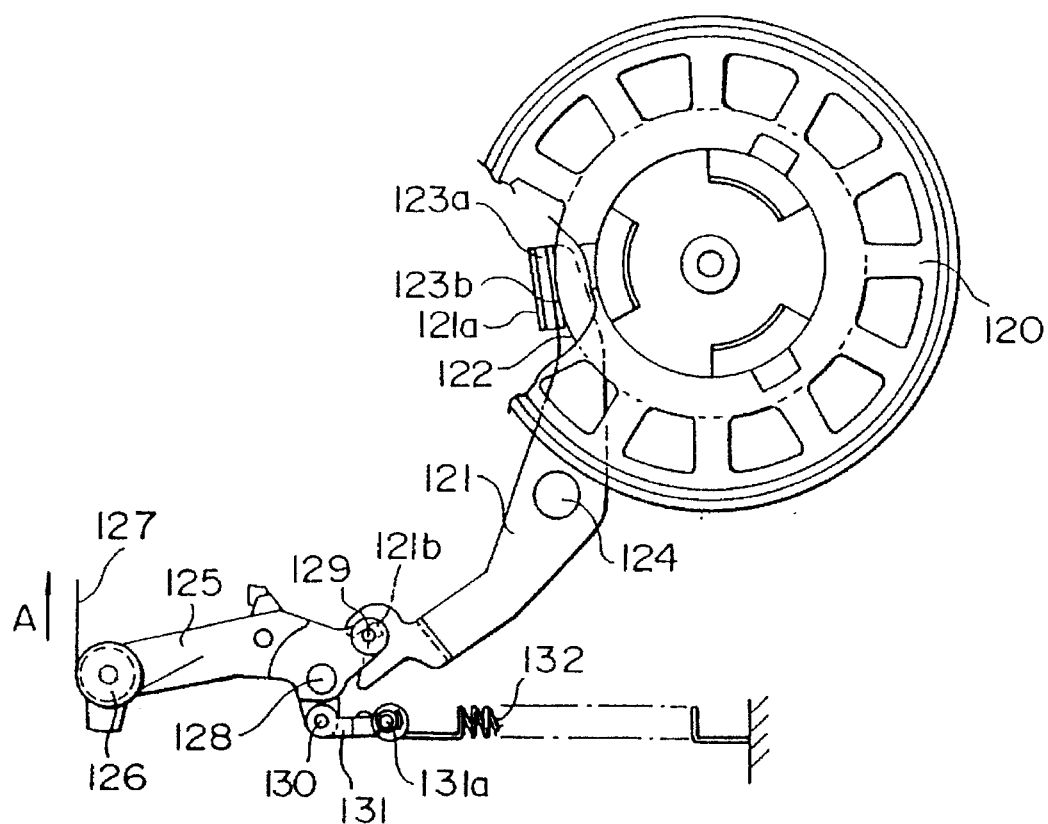
FIG. 28 is a top plan view showing a play state in still another embodiments of the present invention.
Figure 29:
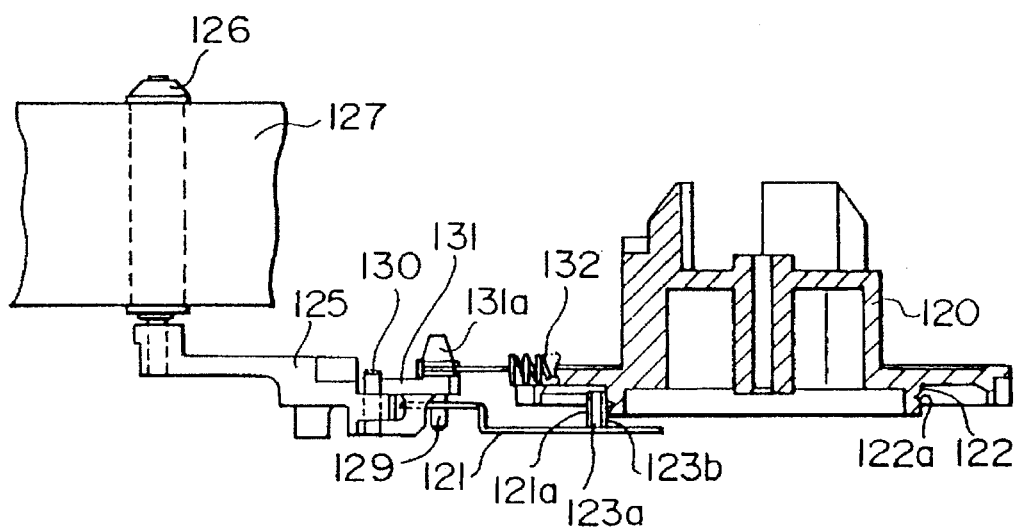
FIG. 29 is a middle view showing a play state in still another embodiment of the present invention.
Figure 30:
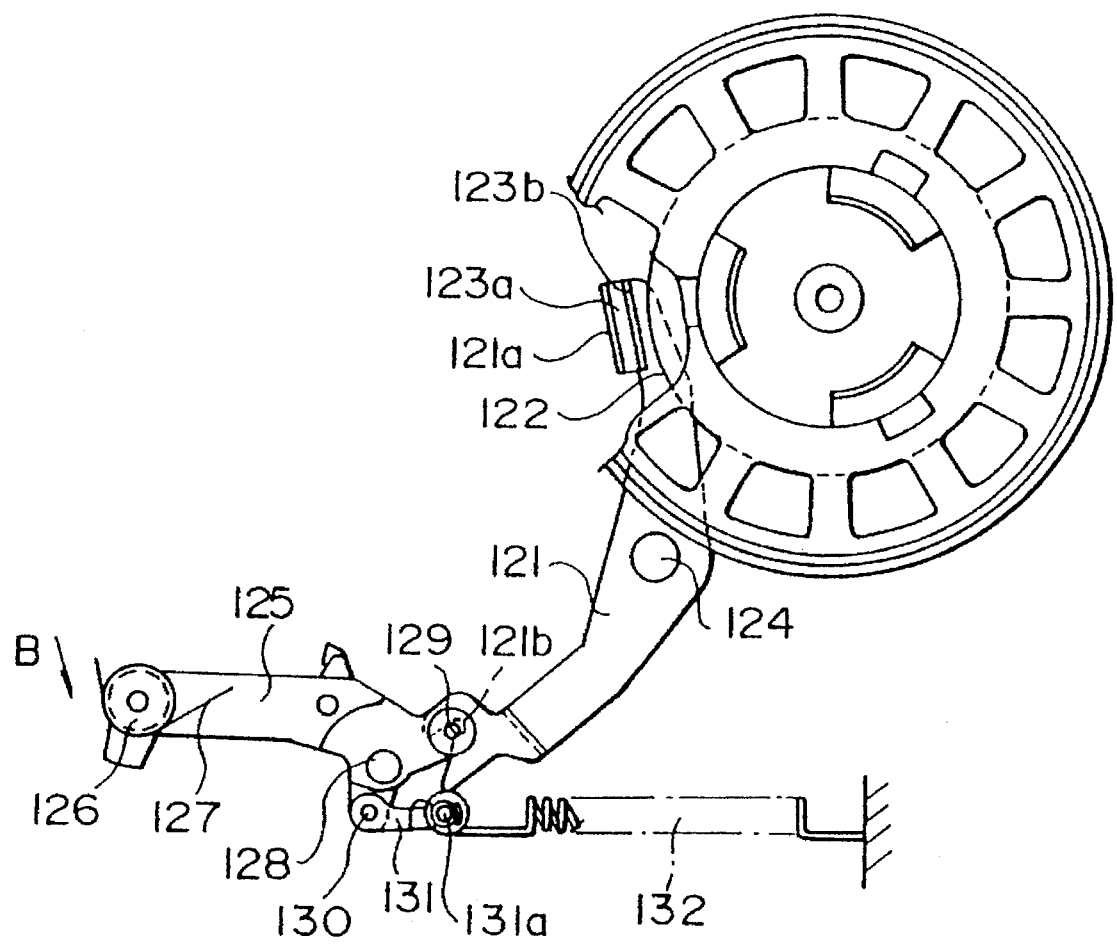
FIG. 30 is a top plan view showing a review state in still another embodiment of the present invention.
Figure 31:
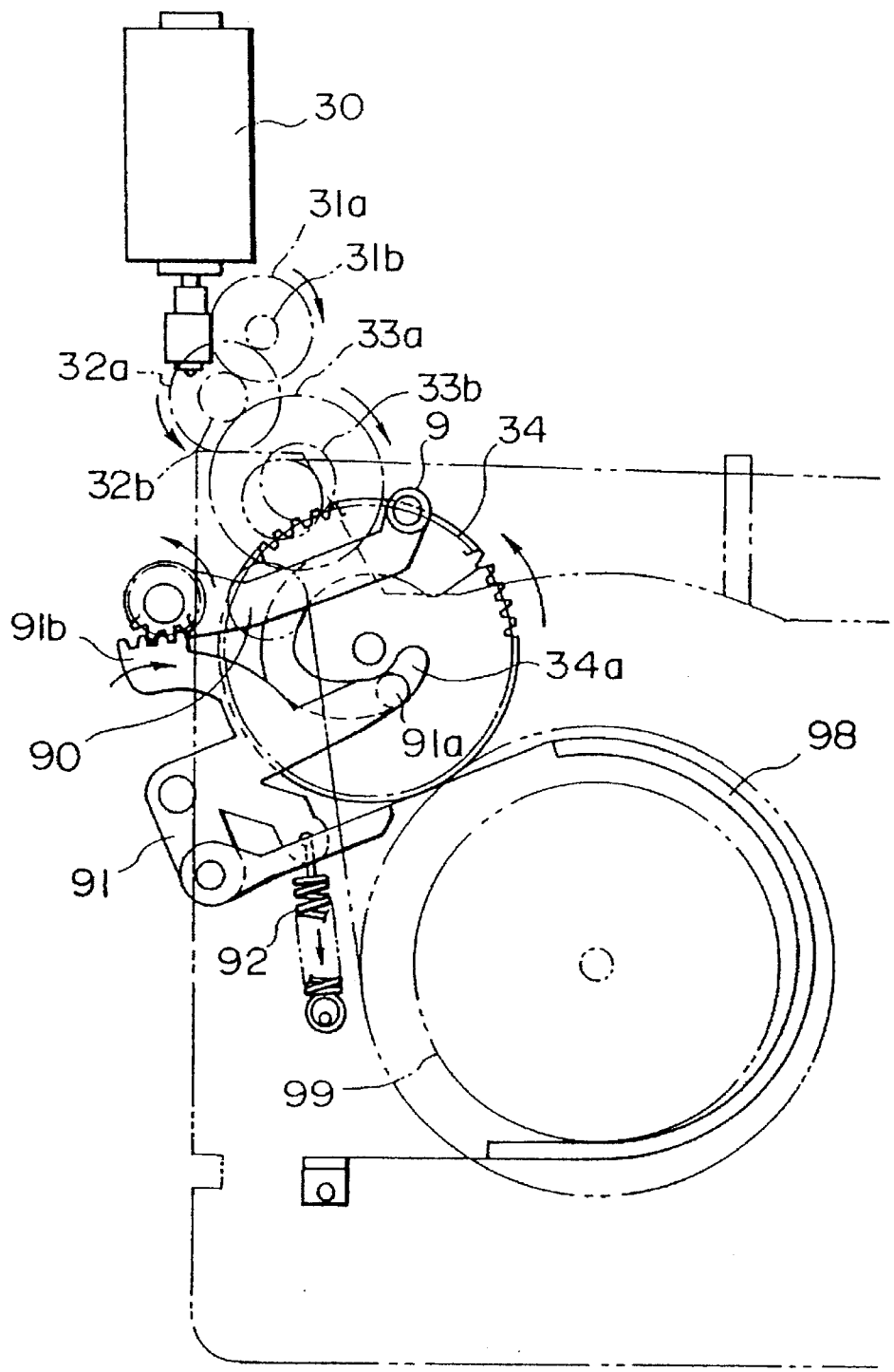
FIG. 31 is a view showing a principal arrangement of a tape guide post driving device in a prior art magnetic recording/playback apparatus before the tape loading operation.
Figure 32:
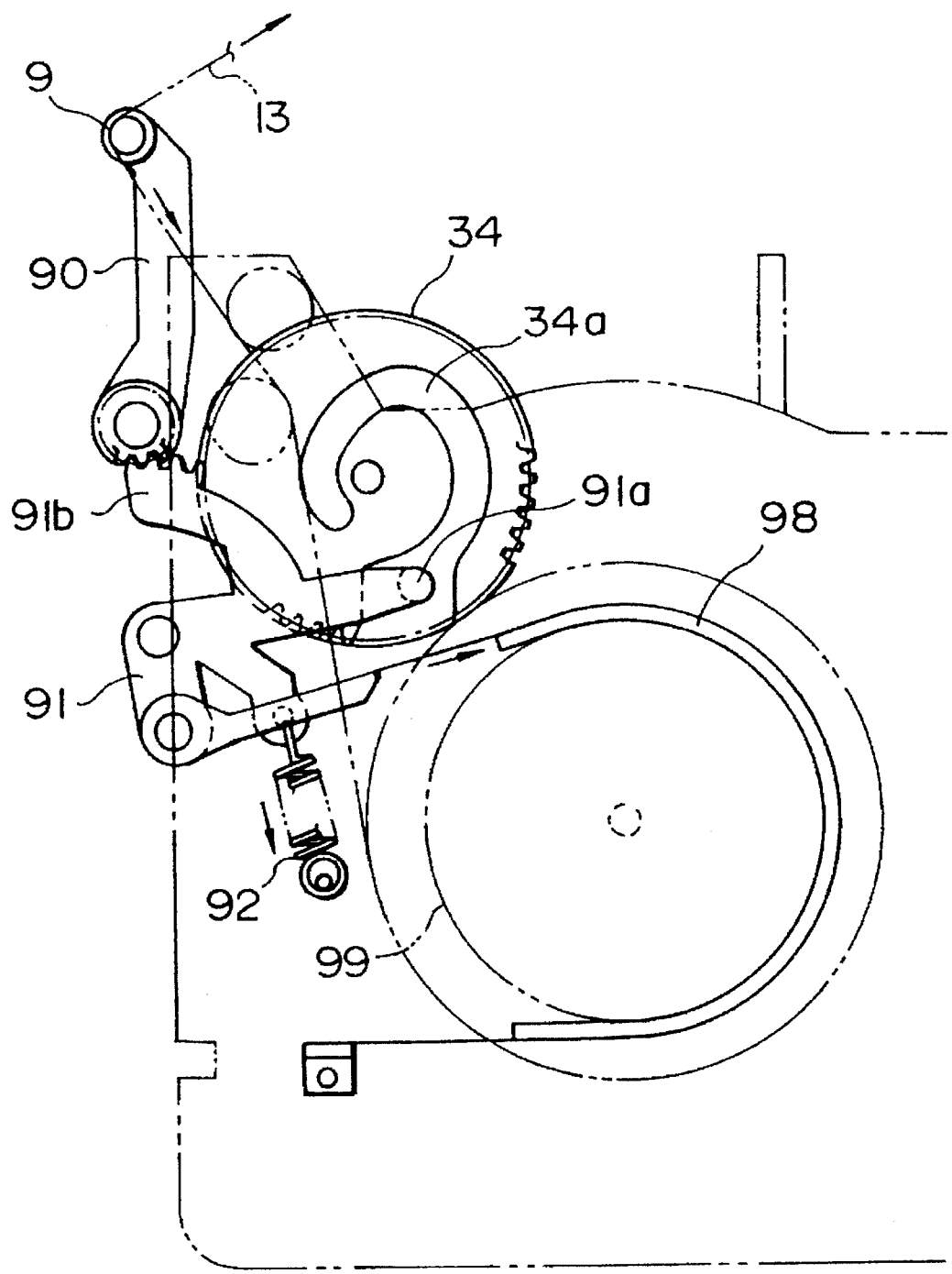
FIG. 32 is a view showing a principal arrangement of the tape guide post driving device in the prior art magnetic recording/playback apparatus after the tape loading operation.
Figure 33:
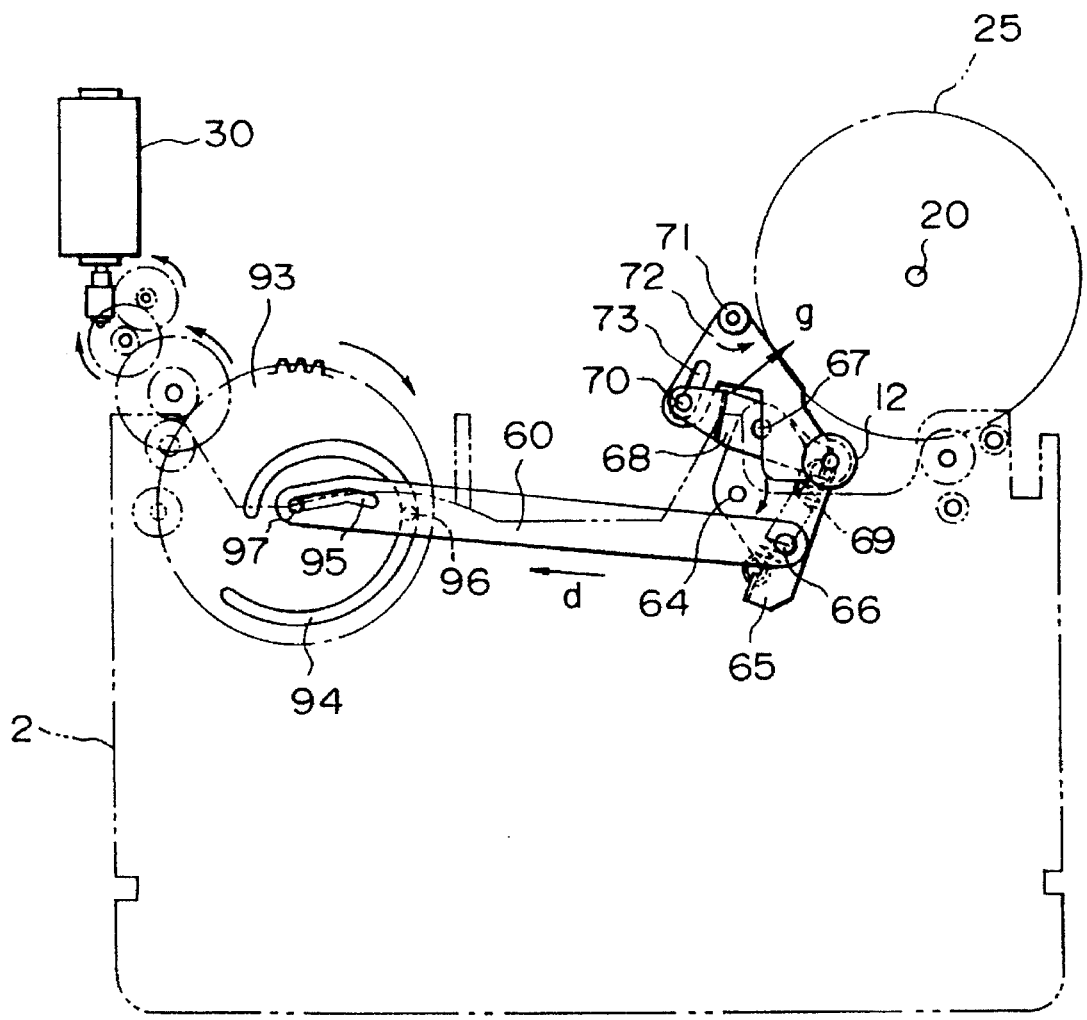
FIG. 33 is a top plan view for explaining an operation of pressing a pinch roller in the prior art.
Figure 34:
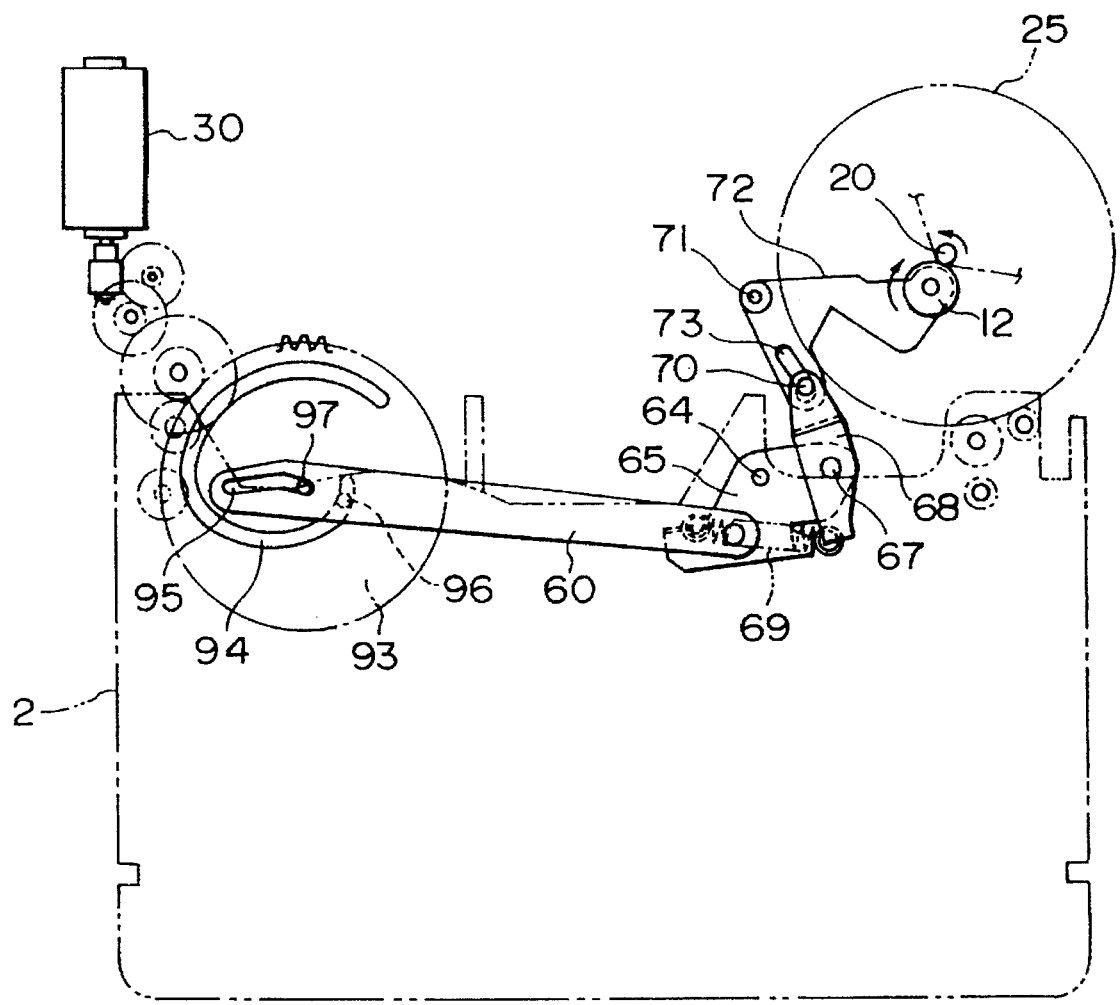
FIG. 34 is a top plan view for explaining the operation of pressing the pinch roller in the prior art.
Figure 35:
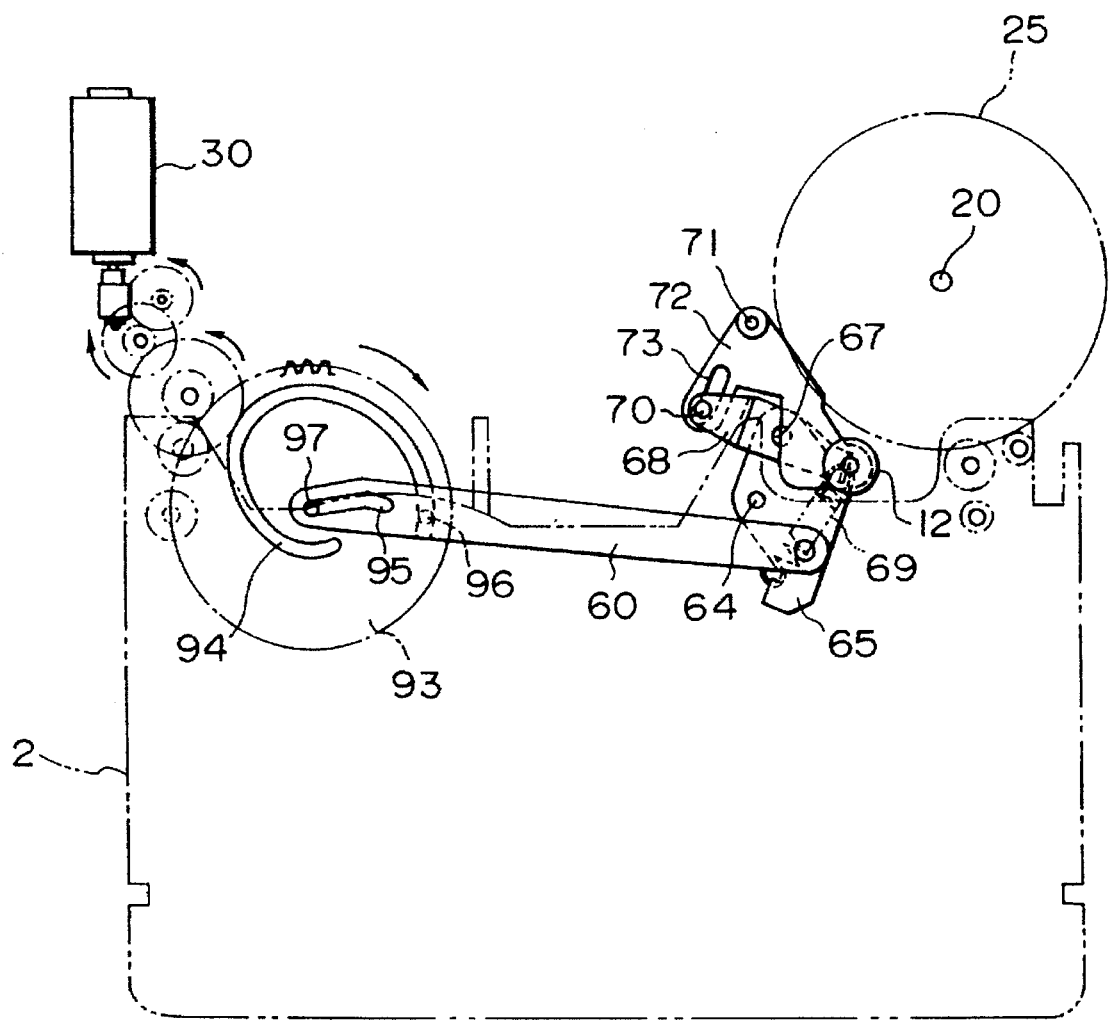
FIG. 35 is a top plan view for explaining the operation of pressing the pinch roller in the prior art.
Figure 36:
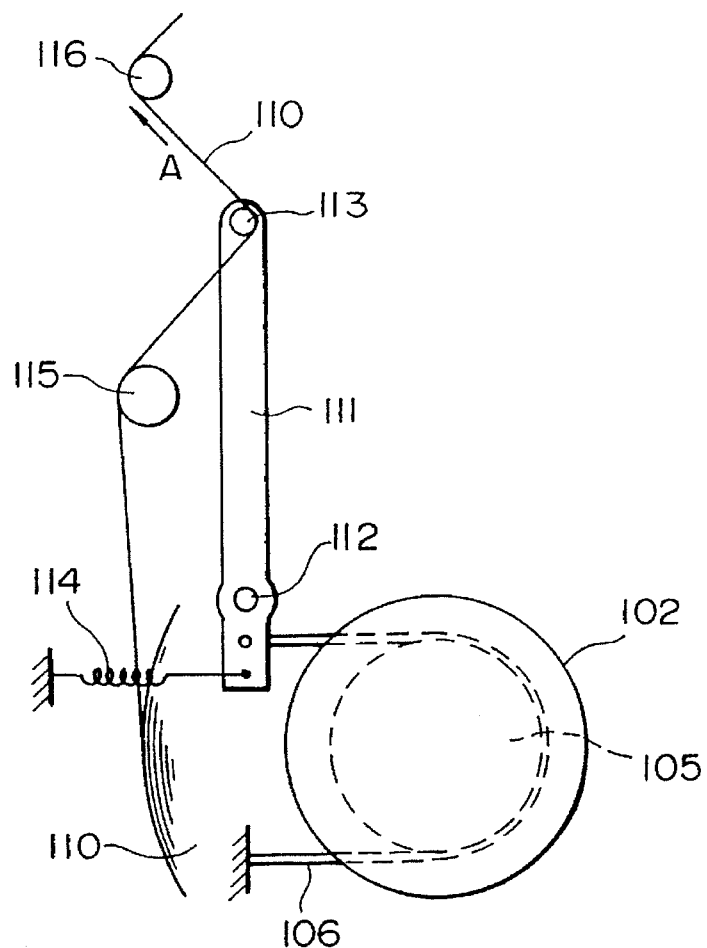
FIG. 36 is a top plan view of a tension servo device in the prior art.
Figure 37:
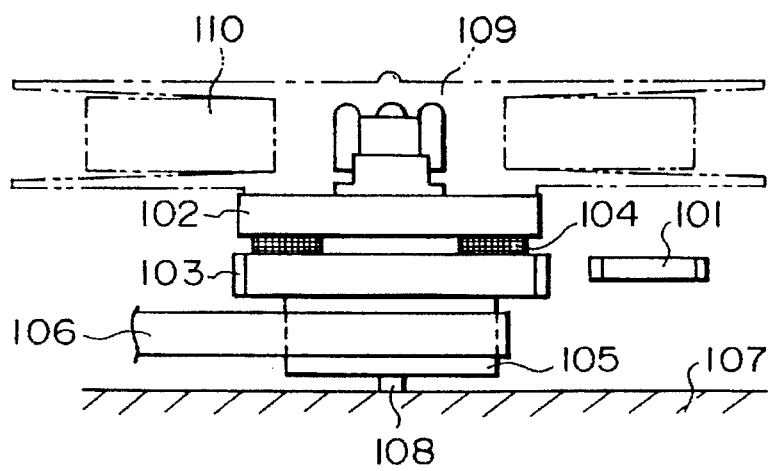
FIG. 37 is a side view of the tension servo device in the prior art.
Figure 38:
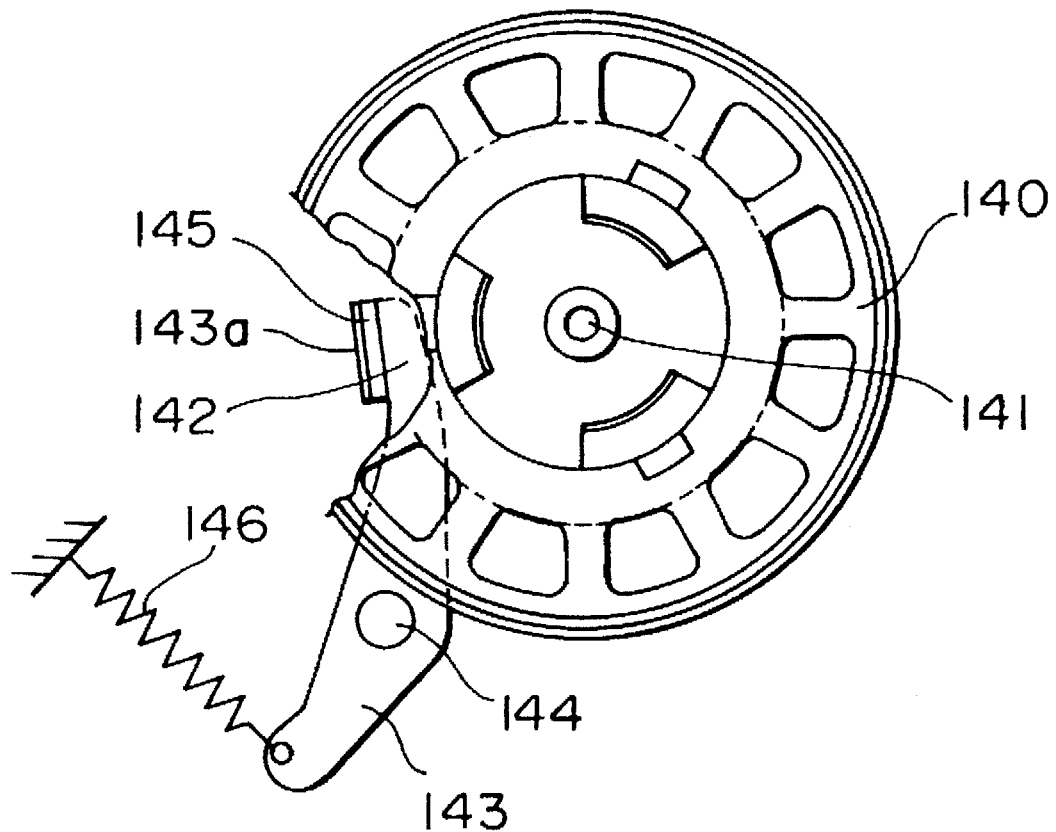
FIG. 38 is a top plan view of a soft braking device in the prior art.

FIG. 28 is a top plan view of the second embodiment of the present invention in a play state, FIG. 29 is a side view, and FIG. 28 to 30, denoted by the reference numeral 120 is a S-reel stand rotatably attached to a shaft (not shown).

Denoted by the reference numeral 121 is a control lever having at one end a bent portion 121a to which a brake member 123 is integrally fixed by bonding at a position corresponding to a cylindrical portion 122 of the S-reel stand 120 to be braked. The brake member 123 is formed of two types of materials and comprises an elastic body 123a made of rubber or the like at the side near the bent portion 121a and a thin film 123b formed of superominent plastic resin, having a high heat-resistant temperature, at the side in contact with the cylindrical portion 122, these materials being bonded together into the one-piece brake member. The cylindrical portion 122 is provided with at least one groove 122a in a vertical range in which the brake member 123 can contact with the cylindrical portion 122. The control lever 121 is provided at the other end with a cut-out 121b and is rotatably attached to a shaft 124. The reference numeral 125 designates a tension lever constituting a tension detecting means and having a post 126 provided at one end. A length of tape 127 travels while winding around the post 125 as shown. The tension lever 125 is turnably attached to a shaft 123 and turns in an interlocking relationship with the control lever 121 because a pin 129 is engaged in the out-out 121b of the control lever 121. The reference numeral 130 designates a pin fixed to the tension lever 125. A spring latch arm 131 is turnably attached to the pin 130. The spring latch arm 131 is provided with a hook 131a, to which is attached the other end of a tension spring 132 having one end fixed to the chassis. The operation of the tension servo device thus arranged will now be explained by referring to FIGS. 28 and 29.

The tension lever 125 is subjected at the pin 130 to the urging force of the tension spring 132 through the spring latch arm 131, so that the tension lever 125 is urged to turn in the counter-clockwise direction. Since the pin 129 is engaged in the cut-out 121b of the control lever 121, the control lever 121 is urged to turn in the clockwise direction and this clockwise turning is restricted since the brake member 123 at one end of the control lever 121 press-contacts with the cylindrical portion 122 of the S-reel stand 120. At this time, therefore, the position of the tension lever 125 with no tape running is established. When the tape 127 travels in a direction of an arrow A, the tension lever 125 is acted on by the force which is produced by the tape winding around the post 126 and tends to turn the tension lever in the clockwise direction against the urging force of the tension spring 132. Then, the control lever 121 is acted by the force tending the same to turn in the counter-clockwise direction, whereupon the force press-contacting the brake member 123 with the cylindrical portion 122 is lessened to diminish a braking torque imposed on the S-reel stand 120, thereby reducing a tape tension. In this way, the tape tension can be controlled. In FIG. 30, when the tape 127 travels in a direction of an arrow 3 due to a winding operation of the S-reel stand 120 in the counter-clockwise direction and the tape tension rises, the control lever 121 is similarly turned in the counter-clockwise direction, so that the brake member 123 is completely separated from the cylindrical portion 122. In the state where the brake member 123 is apart from the cylindrical portion 122 as shown in FIG. 30, it takes a rectangular parallel-piped shape. On the other hand, while both the members are in press-contact with each other as shown in FIG. 28, the elastic body 123a is deformed in such a manner that the thin film 123b comes into full contact with the cylindrical portion 122 over the former's entire surface to produce the braking torque. As a result, a PV value is lowered. By using superominent plastic resin, the thin film 123b can be prolonged in its service life. Since the cylindrical portion 122 is provided with at least one groove 122a, abrasion dust produced from the thin film 123b or the cylindrical portion 122 enters the groove 122a and then falls down to the esterior during rotation of the S-reel stand. Thus, the stable braking torque is obtained. While this embodiment is explained in connection with the tension servo device, it is needless to say that the similar arrangement can also be employed in a usual soft braking device. Further, while the control lever 121 and the tension lever 125 are explained as being separate parts, they may be formed into a one-piece lever. Additionally, the tension spring 132 is attached to the tension lever 125 through the spring latch arm 131, it may be directly attached to the tension lever 125.

As described above, according to the present invention, in contrast with the prior art that a braking torque is applied to a S-reel stand by using many parts of a band system, the braking torque can be applied by using only a brake member, making it possible to reduce the number of parts used, eliminate the need of adjustment, and cut down the number of assembling steps. Moreover, since the brake member can be formed of superominent plastic resin, it is also possible to reduce a PV value and prolong the service life.

What is claimed is:

1. A magnetic recording/play back apparatus comprising:

a drive member for loading a magnetic tape onto a rotary head cylinder;

a guide post, provided on said drive member, having a projection formed thereon for guiding said magnetic tape; and a leaf type resilient member provided between said guide post and said drive member and integrally formed with said drive member and said guide post to constitute a sloped surface for guiding said magnetic tape onto said guide post, wherein the sloped surface of said resilient member is always urged against the projection of said guide post by resilient force of said leaf type resilient member such that said leaf type resilient member follows vertical movements of said guide post when said guide post is adjusted in height.

* * * * *